US012684292B2

(12) United States Patent
Shi et al.

(10) Patent No.: US 12,684,292 B2
(45) Date of Patent: Jul. 14, 2026

(54) CAR AUDIO PLAYBACK METHOD, SYSTEM, AND CONTROL DEVICE

(71) Applicant: PATEO CONNECT+ Technology (Shanghai) Corporation, Shanghai (CN)

(72) Inventors: Hongren Shi, Shanghai (CN); Yu Zhang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 138 days.

(21) Appl. No.: 18/694,757

(22) PCT Filed: Dec. 2, 2021

(86) PCT No.: PCT/CN2021/135018
§ 371 (c)(1),
(2) Date: Mar. 22, 2024

(87) PCT Pub. No.: WO2023/045081
PCT Pub. Date: Mar. 30, 2023

(65) Prior Publication Data
US 2025/0008267 A1     Jan. 2, 2025

(30) Foreign Application Priority Data

Sep. 22, 2021    (CN) .......................... 202111107033.2

(51) Int. Cl.
H04R 3/12         (2006.01)
B60Q 5/00        (2006.01)
(Continued)

(52) U.S. Cl.
CPC ................. H04R 3/12 (2013.01); B60Q 5/00 (2013.01); H04R 1/025 (2013.01); H04R 1/403 (2013.01);
(Continued)

(58) Field of Classification Search
CPC ...... H04R 1/025; H04R 2499/13; H04S 7/303
(Continued)

(56) References Cited

U.S. PATENT DOCUMENTS 7,483,539 B2 * 1/2009 Stark ...................... H04B 1/082
381/86
7,957,540 B2 * 6/2011 Ludwig .................... H04S 7/30
381/86
(Continued)

FOREIGN PATENT DOCUMENTS

CN        105792136 A      7/2016
CN        107148782 A      9/2017
(Continued)

OTHER PUBLICATIONS

The World Intellectual Property Organization (WIPO) International Search Report for PCT/CN2021/135018 May 24, 2022 5 Pages (including translation).
(Continued)

*Primary Examiner* — Disler Paul
(74) *Attorney, Agent, or Firm* — Anova Law Group, PLLC

(57) ABSTRACT

A car audio playback method includes: obtaining a request to play audio data, the request at least indicating first area information of a first area for listening to the audio data; determining vehicle quantity information of target cars, each target car including at least one vehicle-mounted external speaker to play the audio data toward the outside of the target car; based on the first area information and the vehicle quantity information, determining a target position of each target car; outputting the target position such that each target car moves to the target position; and controlling each target car to play the audio data via the at least one vehicle-mounted external speaker at its target position.

18 Claims, 13 Drawing Sheets

(51) Int. Cl.

| | |
|---|---|
| *H04R 1/02* | (2006.01) |
| *H04R 1/40* | (2006.01) |

(52) U.S. Cl.
    CPC .... *H04R 2201/401* (2013.01); *H04R 2499/13*
    (2013.01)

(58) Field of Classification Search
    USPC .......................................................... 381/86
    See application file for complete search history.

(56)                    References Cited

U.S. PATENT DOCUMENTS

| | | | | |
|---|---|---|---|---|
| 9,723,409 | B2 * | 8/2017 | Smearcheck | .......... H04R 7/045 |
| 10,015,595 | B2 * | 7/2018 | Lee | ......................... H04S 7/301 |
| 10,708,700 | B1 * | 7/2020 | Salter | .................... H04R 1/025 |
| 10,932,037 | B2 * | 2/2021 | Winton | .................... H04R 5/02 |
| 10,994,653 | B2 * | 5/2021 | Konno | ................... H04R 1/403 |

| | | | | |
|---|---|---|---|---|
| 12,375,855 | B2 * | 7/2025 | Dickins | .................. G06N 20/00 |
| 2009/0109019 | A1 | 4/2009 | Peterson et al. | |
| 2017/0257071 | A1 | 9/2017 | Goeppner | |
| 2018/0063640 | A1 | 3/2018 | Lee | |
| 2019/0251600 | A1 | 8/2019 | Cabrera et al. | |
| 2019/0268083 | A1 | 8/2019 | Cho et al. | |

FOREIGN PATENT DOCUMENTS

| | | |
|---|---|---|
| CN | 109040911 A | 12/2018 |
| EP | 3136749 A1 | 3/2017 |
| GB | 2613682 A | 6/2023 |
| WO | 2018228404 A1 | 12/2018 |

OTHER PUBLICATIONS

The European Patent Office (EPO) The Extended European Search Report for Application No. 21958193.1 Nov. 25, 2024 12 Pages.

* cited by examiner

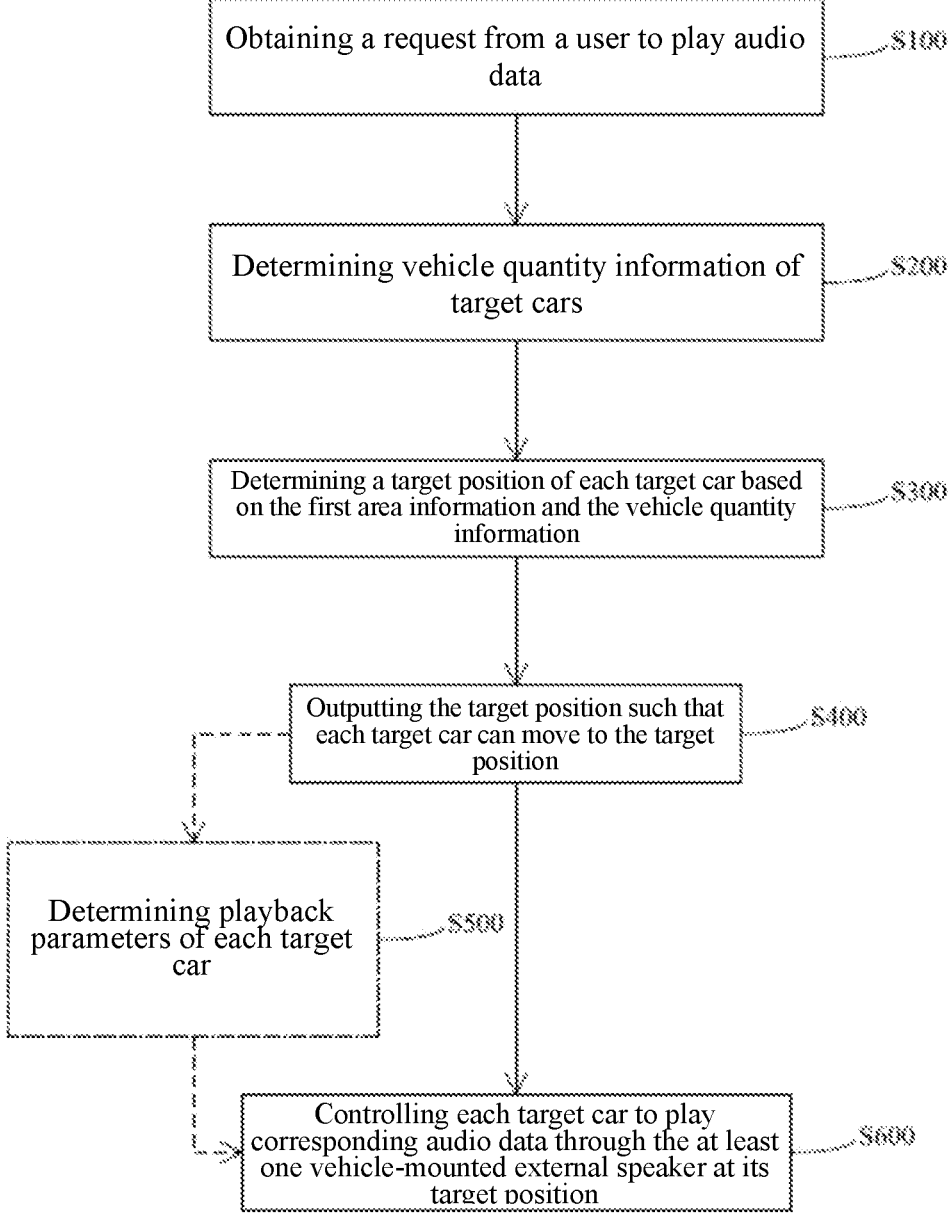

Obtaining a request from a user to play audio data — S100

Determining vehicle quantity information of target cars — S200

Determining a target position of each target car based on the first area information and the vehicle quantity information — S300

Outputting the target position such that each target car can move to the target position — S400

Determining playback parameters of each target car — S500

Controlling each target car to play corresponding audio data through the at least one vehicle-mounted external speaker at its target position — S600

FIG. 3

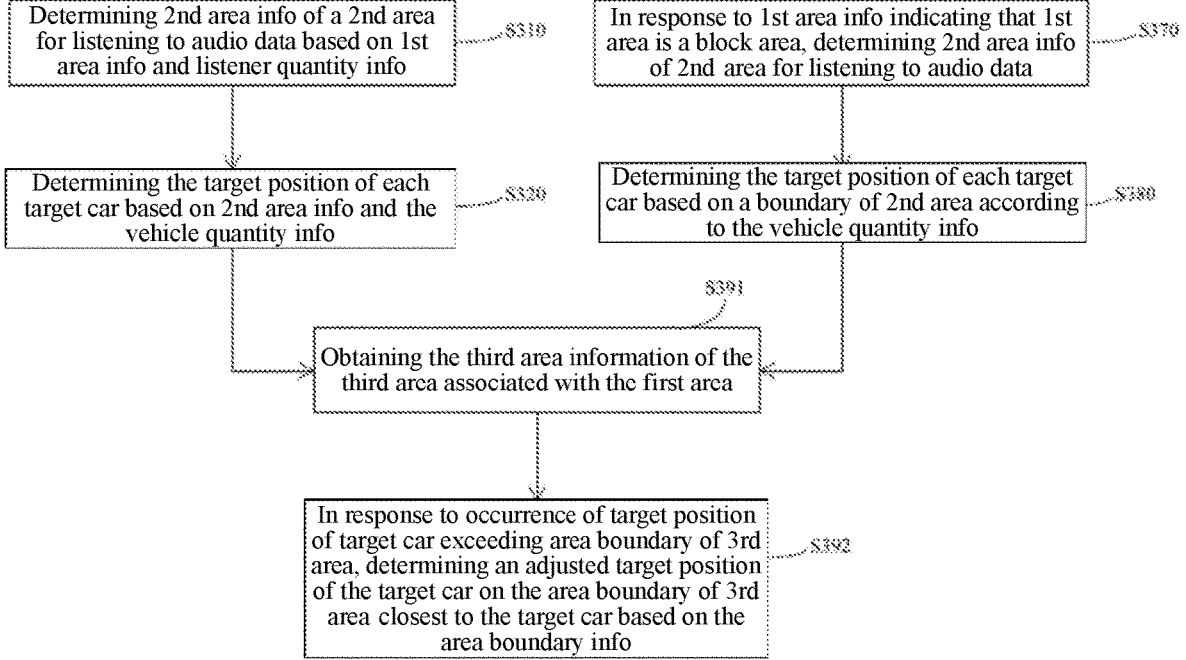

Determining 2nd area info of a 2nd area for listening to audio data based on 1st area info and listener quantity info ····S310

Determining the target position of each target car based on 2nd area info and the vehicle quantity info ····S320

In response to 1st area info indicating that 1st area is a block area, determining 2nd area info of 2nd area for listening to audio data ····S370

Determining the target position of each target car based on a boundary of 2nd area according to the vehicle quantity info ····S380

Obtaining the third area information of the third area associated with the first area ····S391

In response to occurrence of target position of target car exceeding area boundary of 3rd area, determining an adjusted target position of the target car on the area boundary of 3rd area closest to the target car based on the area boundary info ····S392

FIG. 4

CAR AUDIO PLAYBACK METHOD, SYSTEM, AND CONTROL DEVICE

CROSS-REFERENCE TO RELATED APPLICATION

This application is a national phase entry of PCT Patent Application No. PCT/CN2021/135018, filed on Dec. 2, 2021, which claims the priority of Chinese Patent Application No. 202111107033.2, filed on Sep. 22, 2021, the entire content of all of which is incorporated herein by reference.

TECHNICAL FIELD

The present disclosure relates to the technical field of vehicle technology, and more particularly, to a car audio playback method, system, and control device.

BACKGROUND

With the development of the economy, especially the development of the automobile industry, there are now more and more cars on the streets. As consumers spend more to improve their lives, car ownership becomes more and more popular. When purchasing a car, buyers pay more attention to configuration of the car. The buyers demand more features in the configuration to the car. Moreover, as more and more people own their cars, car owners want comfort, entertainment, extra safety, etc. in addition to basic car functions. People want to see seamless transition between car rides and other aspects of their life as technological innovations bring in more possibilities.

For example, car speakers are mostly speakers that are installed inside the car and are used to play audio data for users in the car. Even in some existing technologies, there are cases where rear-mounted speakers are used to emit sounds to the outside of the car to give advanced warning to people outside the car. However, these speakers that emit sounds to the outside of the car mainly serve as a reminder, similar to a car horn.

However, as cars are getting more and more popular and intended use scenarios of the cars are getting more and more versatile, use scenarios and functions of car speakers are expected to expand. For example, families are taking holiday trips by car. In this case, the car is parked outdoors, and people get out of the car and enjoy the scenery in the vicinity of the parked car. At this time, graceful music will certainly enhance such experience. However, due to the openness of outdoor venues, built-in speakers of portable mobile devices (smartphones, tablets) are unable to provide high-quality listening effects. It is unlikely for people to bring professional grade speakers with them during these holiday trips. People may get disappointed for lack of high-quality speakers to provide musical entertainment.

In view of this, the car speakers are expected to be used to build a large mobile speaker that can provide a three-dimensional (3D) surround sound field. The car speakers travel with passengers of the car and are powerful enough for use in open spaces, thereby expanding the use scenarios of cars and improving user experience.

SUMMARY

A brief overview of one or more aspects is given below to provide a basic understanding of these aspects. The summary is not an exhaustive overview of all contemplated aspects and is intended to neither identify key or critical elements of all aspects nor attempt to delineate the scope of any or all aspects. Its sole purpose is to present some concepts of one or more aspects in a simplified form as a prelude to the more detailed description that is presented later.

An objective of the present disclosure is to provide a car audio playback method, system, and control device, which have the advantage of being able to plan and control the distribution of cars equipped with vehicle-mounted external speakers according to the site conditions for listening to audio data, and then play the audio data. It can be used to integrate multiple cars into a large-scale mobile combination speaker that can provide a three-dimensional (3D) surround sound field, which can accompany users on their travels and facilitate their use in open spaces.

Another objective of the present disclosure is to provide a car audio playback method, system and control device, which have the advantage of being able to determine the distribution of each target car according to the area for listening to audio data indicated by the user and the number of target cars, to provide appropriate 3D surround sound field that can improve the overall listening effect and provide a more desired user experience.

Another objective of the present disclosure is to provide a car audio playback method, system and control device, which have the advantage of being able to plan a virtual, regular-shaped area based on the area for listening to audio data indicated by the user to determine the distribution of each target car. The distribution can be adapted to different site requirements, reducing the uncertainty caused by the irregularity of the site shape and the difficulty of determining the distribution of target cars. It is more universal and has a wide range of applications.

Another objective of the present disclosure is to provide a car audio playback method, system and control device, which have the advantage of being able to adjust the distribution of each target car according to the number of listeners and the congestion coefficient to adapt to the needs of different listeners and provide better 3D surround sound field.

Another objective of the present disclosure is to provide a car audio playback method, system and control device, which have the advantage of being able to plan the distribution of each target car by comprehensively considering the side length and are size of the site corresponding to the area for listening to audio data indicated by the user, thereby improving the accuracy and success probability of planning results, and providing users with a better 3D surround sound field.

Another objective of the present disclosure is to provide a car audio playback method, system and control device, which have the advantage of being able to comprehensively determine the playback parameters of each target car in combination with the distribution and orientation of the target car, thereby providing users with 3D surround sound field and improving users' listening experience.

The advantages and features of the present disclosure can be fully demonstrated by the following detailed description and can be realized by the accompanying illustrative embodiments.

One aspect of the present disclosure provides a car audio playback method. The method includes: obtaining a request to play audio data from a user, the request at least indicating first area information of a first area for listening to the audio data; determining vehicle quantity information of target cars, each target car including a plurality of vehicle-mounted external speakers to play the audio data toward the outside of the target car; based on the first area information and the vehicle quantity information, determining a target position of each target car; outputting the target position such that each target car moves to the corresponding target position; and controlling each target car to play the audio data via the plurality of vehicle-mounted external speakers at its target position.

In some embodiments, the request further indicates listener quantity information and determining the target position of each target car based on the first area information and the vehicle quantity information further includes: determining second area information of a second area for listening to the audio data based on the first area information and listener quantity information, the second area being a rectangle area and including the first area; and determining the target position of each target car based on the second area information and the vehicle quantity information.

In some embodiments, the second area information includes a second area size of the second area, side lengths of the second area, and relative position relationship of the second area relative to the first area. Determining the second area information of the second area for listening to the audio data based on the first area information and the listener quantity information further includes: determining a second area size of the second area based on the listener quantity information, per capita area information, and congestion coefficient information; and determining the side lengths of the second area and the relative position relationship of the second area relative to the first area based on at least the first area information and the second area size.

In some embodiments, determining the side lengths of the second area based on at least the first area information and the second area size further includes: determining initial side lengths of the second area based on preset rules and the second area size and determining the initial side lengths to be target side lengths.

In some embodiments, determining the initial side lengths of the second area based on the preset rules and the second area size further includes: obtaining third area information of a third area associated with the first area, the third area information including side lengths of a circumscribed rectangle of the third area; and determining the initial side lengths of the second area based on the preset rules that the side lengths of the second area do not exceed the side lengths of the circumscribed rectangle of the third area.

In some embodiments, determining the side lengths of the second area based on at least the first area information and the second area size further includes: determining the initial side lengths of the second area based on the preset rules and the second area size; and adjusting the initial side lengths of the second area to the target side lengths based on the third area information of the third area associated with the first area, or a user instruction.

In some embodiments, determining the relative position relationship based on at least the first area information and the second area size further includes: in response to the first area information indicating that the first area is a central area, determining the relative position relationship to be that the first area is located in the middle of the second area; or in response to the first area information indicating that the first area is a peripheral area, determining the relative position relationship as the first area passing through a side of the second area.

In some embodiments, before controlling each target car to play the audio data via the plurality of vehicle-mounted external speakers at its target position, the method further includes: determining playback parameters of each target car, the playback parameters including at least one of a target vehicle-mounted external speaker, a target sound channel, or a target volume of each target car. Controlling each target car to play the audio data via the at least one vehicle-mounted external speakers at its target position further includes: controlling the plurality of vehicle-mounted external speakers to play the audio data based on the playback parameters of each target car.

Another aspect of the present disclosure provides a car audio playback system. The system includes: a control device; a plurality of vehicle-mounted external speakers disposed on a plurality of target cars and configured to play audio data externally; and a communication module, the control device communicating with the plurality of vehicle-mounted external speakers through the communication module. The control device is configured to: obtain a request to play the audio data from a user through the communication module, the request at least indicating first area information of a first area for listening to the audio data; determine vehicle quantity information of target cars, each target car including at least one vehicle-mounted external speaker to play the audio data toward the outside of the target car; based on the first area information and the vehicle quantity information, determine a target position of each target car; output the target position such that each target car moves to the corresponding target position; and control each target car to play the audio data via the plurality of vehicle-mounted external speakers at its target position.

Another aspect of the present disclosure provides a control device. The control device includes: at least one processor; and a memory coupled to the at least one processor. The memory includes computer instructions stored thereon, when being executed by the at least one processor, the computer instructions cause the control device to implement the disclosed car audio playback method.

Another aspect of the present disclosure provides a computer-readable storage medium storing computer instructions. When being executed by a processor, the computer instructions implement the disclosed car audio playback method.

BRIEF DESCRIPTION OF THE DRAWINGS

The above-described features and advantages of the present disclosure can be better understood through the detailed description of the embodiments of the present disclosure in conjunction with the accompanying drawings. In the drawings, components are not necessarily drawn to scale, and components with similar related properties or characteristics may have the same or similar reference numerals.

FIG. 3 is a flowchart of an exemplary car audio playback method according to some embodiments of the present disclosure;

FIG. 4 is a flowchart of an exemplary implementation of S300 in FIG. 3;

Figure 1:
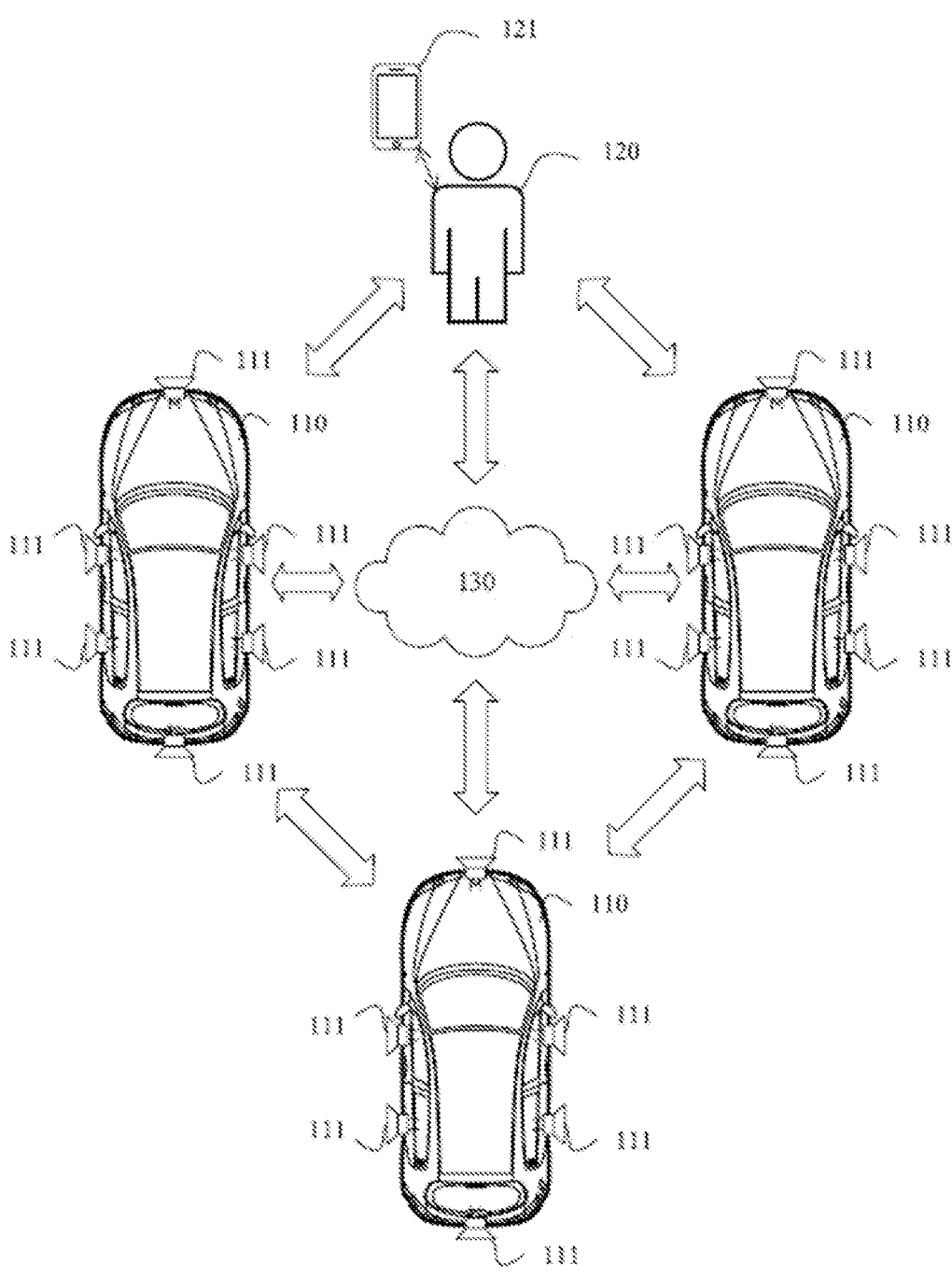
FIG. 1 is a schematic diagram of an exemplary use scenario according to some embodiments of the present disclosure.

Reference numerals in the drawings include 110 car; 111,230 car external speaker; 120 user; 121 mobile device; 130 server; 200 car audio playback system; 210 control device; 220 communication module; 1000, 1000' target car; 1010 first area; 1020 second area; 1030 third area; 1100 control device; 1101 memory; 1102 processor; 1103 bus; 1104 random-access memory (RAM); 1105 cache memory; 1106 storage system; 1107 program module; 1108 external device; 1109 display; 1110 input/output (I/O) interface; and 1111 network adapter.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The present disclosure is described below to enable one skilled in the art to make and use the present disclosure and to contextualize it in a particular application. Various modifications, and various uses in different applications will be readily apparent to those skilled in the art, and the general principles defined herein may be applied to various embodiments. Thus, the present disclosure is not to be limited to the embodiments described herein but is to be accorded the broadest scope consistent with the principles and novel features disclosed herein.

In the specification, various embodiments are described in detail to provide a thorough understanding of the present disclosure. However, it will be apparent to those skilled in the art that the present disclosure need not be limited to these specific details. In other words, well-known structures and devices are shown in the form of block diagrams rather than in detail to avoid obscuring the present disclosure.

Readers are invited to pay attention to all documents and literatures that are submitted at the same time with this specification. The documents and literatures are open to public, and the contents of all such documents and literatures are incorporated herein by reference. All features disclosed in the specification including accompanying claims, abstract and drawings may be replaced by alternative features serving the same, equivalent or similar purpose, unless stated otherwise directly. Thus, unless expressly stated otherwise, each feature disclosed is intended to be exemplary of a group of equivalent or similar features.

Symbols such as left, right, front, back, top, bottom, front, back, clockwise and counterclockwise are used for convenience only and do not imply any specific fixed direction. In fact, they are used to reflect the relative position and/or orientation between parts of an object. In addition, the terms "first" and "second" are used for descriptive purposes only and are not to be understood as indicating or implying relative importance.

Terms such as "further" and "preferably" are simply starting points for elaborating another embodiment based on the foregoing embodiments. Contents of embodiments before and after the terms may be combined to serve as a complete composition of another embodiment. Contents of multiple embodiments before and after the terms may be arbitrarily combined to form yet another embodiment.

The present disclosure will be described in detail below with reference to the accompanying drawings and specific embodiments. Aspects described below in conjunction with the drawings and specific embodiments are only exemplary and should not be construed as any limitation on the scope of the present disclosure.

As described above, the present disclosure provides a method and system of using a user's car to build a large mobile speaker that can provide a three-dimensional (3D) surround sound field. The large mobile speaker can accompany the user when traveling, facilitate the user's use in open spaces, and expand use scenarios of the car, thereby improving user experience.

In the above use scenario of a family driving outing, multiple families may be coordinated to drive multiple cars for a same outing. They may park their cars at an open lawn. Speakers of multiple cars may be combined together to form a large mobile speaker supporting 3D surround sound fields, thereby providing the families a desired user experience of enjoying audio playback in an open space.

In some other examples, such as a music festival, an outdoor movie screening, and other use scenarios, a high-quality sound field needs to be provided, and additional speakers need to be transported to properly arrange desired sound effect. The transportation of the additional speakers in such scenarios can be labor-intensive, and it may be inflexible to allocate the speakers at proper positions.

Therefore, the present disclosure provides the method of integrating speakers of the multiple cars to form a combined speaker system to provide the desired 3D surround sound field. The method will not only facilitate users to listen to the audio playback by the speakers of the cars in the open field, but also provide a substantially improved audio listening experience. This can further expand the use scenarios of the cars and greatly improve the user experience. The car audio playback method, system, and control device thereof will be described in detail below.

FIG. 1 is a schematic diagram of an exemplary use scenario according to some embodiments of the present disclosure. As shown in FIG. 1, the present disclosure is applied in a car environment to combine a plurality of vehicle-mounted external speakers 111 from a plurality of cars 110 to form a large mobile speaker, such that one or more users 120 can listen to the audio playback from the large mobile speaker outside the plurality of cars 110. The one or more users 120 can use their vehicle-mounted external speakers 111 to achieve audio playback in an outdoor setting, such as a lawn, a square or plaza, and a camp ground, etc., or in an indoor setting, such as an underground parking garage, an empty factory or warehouse, and an indoor sport facility, etc. In particular, the present disclosure provides a large mobile combination speaker mode in which the external speakers of the plurality of cars are integrated to provide a 3D surround sound field. The use scenario is suitable for a wedding ceremony, a lawn party, a music festival, an outdoor movie screening, and other occasions that require the use of the large mobile speaker. By consolidating the external speakers of the plurality of cars into the large mobile speaker, it is also possible to reduce the need for traditional mobile speakers, thereby lowering an event cost.

Figure 2:
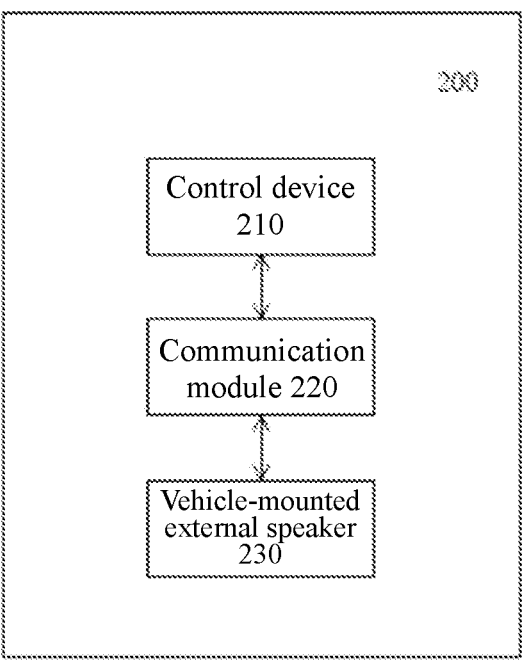
FIG. 2 is a schematic structural diagram of an exemplary car audio playback system according to some embodiments of the present disclosure.

FIG. 2 is a schematic structural diagram of an exemplary car audio playback system according to some embodiments of the present disclosure. As shown in FIG. 2, the car (i.e., vehicle-mounted) audio playback system 200 includes a control device 210, a communication module 220, and a plurality of vehicle-mounted external speakers 230 arranged on a plurality of cars to emit sounds outward. The control device 210 communicates with the plurality of vehicle-mounted external speakers 230 through the communication module 220.

The car audio playback method provided by the present disclosure is implemented by the car audio playback system, especially by the control device 210 in the car audio playback system 200. In some embodiments, as shown in FIG. 1 and FIG. 2, the control device 210 is an on-vehicle system of each of the plurality of cars 110. In some embodiments, a host car is determined among the plurality of cars that communicate with each other. The on-vehicle system of the host car serves as the control device 210 to implement the car audio playback method provided by the present disclosure. The on-vehicle system refers to an operating system that is installed at the time of car manufacture or is installed as an add-on option. The on-vehicle system provides functions such as control of the car, feedback of car status data, navigation, entertainment, and audio-visual function, and one or more functions that can be implemented currently or in the future on the car, thereby effectively improving the electronics, networks and intelligent level of the car. For example, the on-vehicle system can be an existing in-vehicle infotainment system (IVI). The above examples of the on-vehicle system are merely illustrative and should not unduly limit the scope of the present disclosure.

In some embodiments, the control device 210 is a server 130. The server 130 communicates with each of the plurality of cars 110 through the communication module 220, such that the car audio playback method provided by the present disclosure can be implemented.

In some embodiments, a user 120 connects to the car audio playback system 200 through a mobile device 121 carried by the user 120, such that the user 120 can control the plurality of vehicle-mounted external speakers 111 through the mobile device 121 outside the plurality of cars, thereby achieving integration of the plurality of vehicle-mounted external speakers 111 into a combination speaker.

Although it is possible to provide a 3D surround sound field through the combination of the plurality of cars 110, embodiments of the present disclosure are described to achieve a desired 3D sound effect. In some embodiments, as shown in FIG. 1, the plurality of vehicle-mounted external speakers 111 are installed on at least a hood of a front trunk and a left-front door, a right-front door, a left-rear door, a right-rear door, and a trunk lid of each of the plurality of cars 110, thereby creating a 3D and surround sound field when the plurality of vehicle-mounted external speakers 111 are all operating at the same time.

The control device 210 is configured to: obtain a request to play audio data from the user 120 through the communication module 220, where the request at least indicates first area information of a first area for listening to the audio data; determine vehicle quantity information of target cars; based on the first area information and the vehicle quantity information, determine a target position of each target car; output the target position such that each target car can move to the corresponding target position; and control each target car to play the audio data via the plurality of vehicle-mounted external speakers 230 at its target position.

It should be understood that the above control device 210 may be considered as a general processor. The control device 210 may include a memory and a processor. The memory may include, but is not limited to, a computer-readable storage medium provided in another aspect of the present disclosure, with computer instructions stored thereon. The processor may be connected to the memory and may be configured to execute the computer instructions stored on the memory to implement the car audio playback method provided by the embodiments of the present disclosure.

The communication module 220 may be a module that implements existing or future communication technologies. The communication module 220 may include, but is not limited to, a Bluetooth module, a UWB module, a mobile data module, a NearLink module, and a Wi-Fi module, etc.

A target car refers to a car that is controlled to be integrated into a combination speaker in the present disclosure. In other words, the plurality of vehicle-mounted external speakers 111 mounted on the target car will be controlled to operate (that is, to emit sound outside a vehicle body).

The present disclosure provides a 3D and surround sound field by controlling a plurality of cars and a plurality of vehicle-mounted external speakers mounted thereon. The 3D and surround sound field in the present disclosure should be understood from the perspective of broadest and minimum requirements. For example, a user faces forward. If there are cars included in an operation in the front-left and rear-left of the user, the plurality of vehicle-mounted external speakers of a car located in the front-left are controlled to play an audio corresponding to a front-left channel, and the plurality of vehicle-mounted external speakers of a car located in the front-right are controlled to play an audio corresponding to a front-right channel, thereby achieving a left and right surround sound effect. If there are cars included in an operation in the front and rear of the user, the plurality of vehicle-mounted external speakers of a car located at the front are controlled to play an audio corresponding to a front channel, and the plurality of vehicle-mounted external speakers of a car located at the rear are controlled to play an audio corresponding to a rear channel, thereby achieving a front and rear surround sound effect. Moreover, because different cars are responsible for playing audio data corresponding to different channels, channel waveforms of the audio data corresponding to different channels are not exactly the same, thereby creating a 3D sound effect.

The car audio playback method provided by the present disclosure will be described below in conjunction with application scenarios of the present disclosure and the car audio playback system. As shown in FIG. 3, the car audio playback method provided by the present disclosure includes the following processes.

At S100, a request is obtained from a user to play audio data, where the request at least indicates first area information of a first area for listening to the audio data.

At S200, vehicle quantity information of target cars is determined. Each target car includes at least one vehicle-mounted external speaker that play the audio data outside the target car.

At S300, a target position of each target car is determined based on the first area information and the vehicle quantity information.

At S400, the target position is outputted such that each target car can move to the target position.

At S600, each target car is controlled to play corresponding audio data through the at least one vehicle-mounted external speaker at its target position.

At S100, the user's request to play the audio data may be obtained through a communication module. The user may enter the request to play the audio data through an interactive interface. The request at least indicates first area information of a first area for listening to the audio data. It should be understood that the first area information is used to describe the first area for listening to the audio data. Generally, the first area indicated by the user may represent a current position of the user or a position of a listener when the user expects the listener to listen to the audio data. The position may be, for example, a coordinate point, that is, a point area, or it may be an area range (e.g., an area where listeners will gather or distribute), that is, a block area. The first area information may include GPS coordinate information of the first area, whether the first area is a point area or a block area, and whether the first area is a central area or a peripheral area, etc.

When the user indicates the first area, a point area may be represented by indicating a point coordinate on a map displayed on the interactive interface. The point area (a range of the closed area range is smaller than a preset threshold) or a block area may be represented by drawing a closed area on the map displayed on the interactive interface. Alternatively, a preset shape (representing the first area) displayed on the map of the interactive interface may be moved to indicate the location of the first area.

On the other hand, the request may also indicate the audio data that needs to be listened to, that is, the request may include identification information of the audio data. The identification information of the audio data may be a URL address, an audio name, etc., which may be used to obtain the audio data (or audio data resource) and thus play the audio data.

In the above embodiment, the vehicle quantity information of the target cars at S200 may be determined based on a number of cars equipped with on-site vehicle-mounted external speakers (based on communication connection conditions or on-site images), or may be specified target cars or the number of target cars determined by the user. Thus, the vehicle quantity information of the target cars can be determined. Alternatively, the vehicle quantity information of the target cars may be determined based on venue information and a number of listeners.

Figure 8:
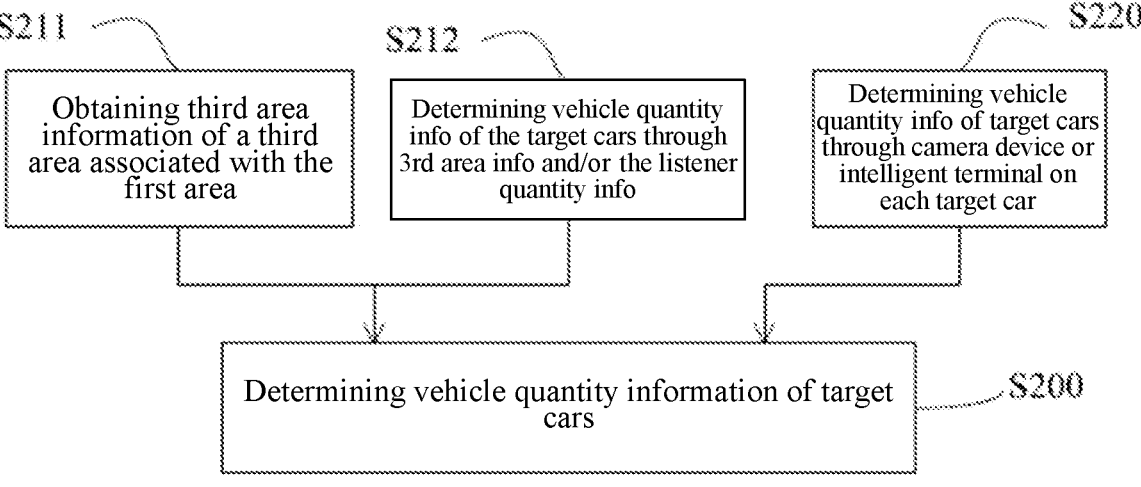
FIG. 8 is a flowchart of an exemplary implementation of S200 in FIG. 3.

Embodiments of S200 are further described in conjunction with FIG. 8. In some embodiments, the vehicle quantity information of the target cars may be determined based on the following processes. At S211, third area information of a third area associated with the first area is obtained. At S212, the vehicle quantity information of the target cars is determined based on the third area information and listener quantity information indicated by the request.

In some embodiments, the vehicle quantity information of the target cars is determined based on the following processes. At S220, the vehicle quantity information of the target cars is determined through a camera device or an intelligent terminal installed on each target car.

At S211, the third area associated with the first area refers to an entire open space where the first area is located. The open space is determined through the first area defined by the user. For example, a point of interest (POI, point of interest) where the first area is located can be the third area. In terms of scope, the third area includes the first area.

Similarly, the third area information is used to describe the third area. The third area information may include GPS coordinate information of the third area, a periphery length, and area size information of the third area, etc. When the user's request already includes the first area information of the first area, those skilled in the art may determine the third area information by querying map data, and real-time detection, etc.

If the request output by the user at S100 includes the listener quantity information, the listener quantity information and the third area information of the third area can be directly used to determine a required number of target cars. In some other embodiments, if the request output by the user at S100 does not include the listener quantity information, a default number of listeners may be 1, or the listener data information may be represented according to a preset value.

At S212, the required vehicle quantity information of the target cars is determined through the third area information and/or the listener quantity information. For example, if the third area is large and the number of listeners is large, more cars are needed. If the third area is not large, even if the number of listeners is large, the number of cars required will be reduced. On the other hand, the vehicle number information of the target cars may have a mapping relationship with the listener number information. For example, the default mapping relationship is that 1-10 listeners correspond to two cars, and 11-30 listeners correspond to three cars, etc. The vehicle quantity information of the target cars determined at S212 is a theoretical value or a recommended value.

Through S211 and S212, the number of cars required to provide a 3D surround sound field corresponding to the user's situation can be determined based on actual venue conditions and the number of listeners, making it possible to provide a suitable 3D surround sound field subsequently. Moreover, based on the theoretical value or recommended value of the vehicle quantity information, users are provided with a quantitative reference when preparing target cars in an early stage, thereby preventing the users from blindly providing too many cars or not providing enough cars.

At S220, the vehicle quantity information of the target cars is determined through the camera device or the intelligent terminal installed on each car. The camera device may be a panoramic or wide-angle camera installed on each car to acquire images of the exterior of the car. The camera device may be able to communicate with the control device 210. Through the camera device, it is possible to know quantity information of the currently available cars, and thereby determining the vehicle quantity information of the target cars based on the quantity information of the available cars. The vehicle quantity information of the target cars determined at S220 is data combined with the actual situation.

In some embodiments, at S220, the vehicle quantity information of the target cars may be determined by a number of the intelligent terminals on the cars. The intelligent terminals on the cars refer to vehicle-mounted systems (including communication modules) provided on the cars. In some embodiments, there is a communication connection between each vehicle-mounted system and the control device 210. By obtaining the number of vehicle-mounted systems that are communicatively connected to the control device 210, the quantity information of currently available cars can be determined, such that the vehicle quantity information of the target cars can be determined based on the quantity information of the available cars. The communication connections include but are not limited to Bluetooth connections, UWB connections, mobile data connections, and Wi-Fi connections, etc. The vehicle quantity information of the target cars determined at S220 is data combined with the actual situation.

At S220, because the vehicle quantity information is the data combined with the actual situation, the positions of the target cars subsequently determined based on the vehicle quantity information reflect the actual situation and have more practical significance. On the other hand, the processes of S211-212 and S220 may be combined to determine more appropriate vehicle quantity information. That is, if the number of currently available cars determined at S220 is greater than the number of the currently available cars determined at S211-212, the theoretical number determined at S211-212 may be used in subsequent processes to save energy as much as possible while providing a suitable 3D surround sound field.

Referring to FIGS. 4 to 7B, S300 in FIG. 3 for determining the target position of each target car based on the first area information and the vehicle quantity information is illustrated. In some embodiments, as shown in FIG. 4, S300 further includes the following processes.

At S310, second area information of a second area for listening to the audio data is determined based on the first area information and the listener quantity information. The second area is a rectangle area and includes the first area.

At S320, the target position of each target car is determined based on the second area information and the vehicle quantity information.

In some other embodiments, S300 further includes the following processes.

At S370, in response to the first area information indicating that the first area is a block area, the second area information of the second area for listening to the audio data is determined. The second area is a circumscribed rectangle area of the block area.

At S380, the target position of each target car is determined based on a boundary of the second area according to the vehicle quantity information.

Subsequently, in some other embodiments, after the target position of each target car is determined through S320 or S380, S300 further includes the following processes.

At S391, the third area information of the third area associated with the first area is obtained. The third area information includes area boundary information indicating an area boundary of the third area.

At S392, in response to occurrence of the target position of the target car exceeding the area boundary of the third area, an adjusted target position of the target car on the area boundary of the third area closest to the target car is determined based on the area boundary information.

To determine whether S300 corresponds to S310-320 or S380-390, the present disclosure sets a rectangular second area, and based on the rectangular second area, determines the target position of each target car on the boundary of the second area. Even in various site conditions, the target position of each target car can still be determined efficiently, conveniently and accurately. As described above, the first area is defined by the user. The first area is usually a point area (corresponding to S310-320). Even if the first area is a block area, the block area can still be simplified to (i.e., shrunk to) a point area. Alternatively, the first area may be a block area (corresponding to S380-390), and the block area is generally larger than a preset size. The block area defined by the user may not be guaranteed to have a regular shape, which causes difficulties in determining the target position of each target car. Thus, a virtual, regular-shaped second area can be planned based on an area indicated by the user for listening to the audio data. The second area is set to include the first area, that is, the first area is inside the second area, or completely overlaps with the second area. It can be adapted to different site conditions, facilitate the positioning of the target car, reduce the uncertainty caused by the irregularity of the site shape, and it is more universal and suitable for a wide range of applications.

In the present disclosure, because the virtual second area used to assist planning has a regular shape and distances relative to the listeners are relatively regular, the distribution of target cars can be made more regular, thereby ensuring the provided sound field effect. Because the distribution of the target cars is relatively regular, it is easier to determine playback parameters of the target cars subsequently, thereby simplifying control requirements for the vehicle-mounted external speakers.

In addition, the present disclosure takes consideration of the actual site conditions at S300, and adjusts the target position of the target car according to the third area associated with the actual site, such that the target position of the target car has more practical significance to ensure that the target position of the target car can be used in subsequent operations to park the target car at the designated target position.

Figure 5:
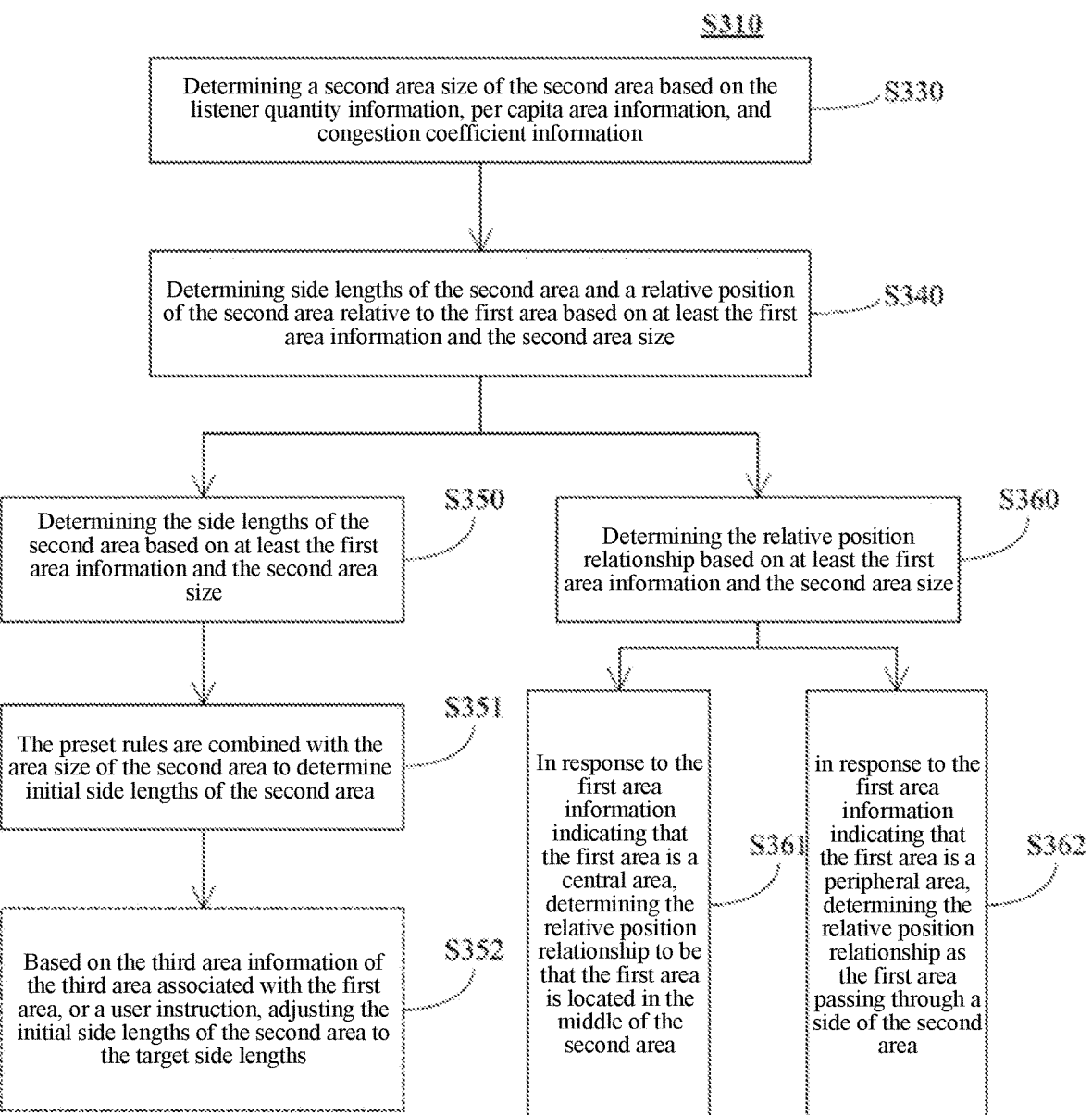
FIG. 5 is a flowchart of an exemplary implementation of S310 in FIG. 4.

Referring to FIG. 5, S310 further includes the following processes.

At S330, a second area size of the second area is determined based on the listener quantity information, per capita area information, and congestion coefficient information.

At S340, side lengths of the second area and a relative position of the second area relative to the first area are determined based on at least the first area information and the second area size.

The shape of a rectangle may be determined by a size ratio of the side lengths of the rectangle, and its size may be determined by sizes of the side lengths. After determining the shape and size, if a position of the rectangle can be determined, then it is considered that the relevant information of the second area can be completely determined, and therefore, the target position of the target car can be determined based on the boundary of the second area. Therefore, S340 further includes the following processes.

At S350, the side lengths of the second area are determined based on at least the first area information and the second area size.

At S360, the relative position relationship is determined based on at least the first area information and the second area size.

The listener quantity information has been described at S330 and will not be described again herein. In some embodiments, the per capita area information and the congestion coefficient information may be indicated by the user's request at S100. In some other embodiments, the per capita area information and the congestion coefficient information may be preset. The per capita area information may be a fixed reference value of the per capita area determined based on empirical values. On the other hand, the per capita area information may also be area information determined based on the fixed reference value and after excluding areas occupied by some fixed equipment on site.

It should be noted that the congestion coefficient information needs to be understood from the broadest perspective. In some embodiments, for example, the user's request indicates the congestion coefficient information. The congestion coefficient information indicated in the user's request may not be absolute numerical information, and the user's request may include descriptive information such as "crowded", "medium", or "comfortable", which can be converted into numerical information according to relevant mapping rules.

For example, assuming that the reference value of the per capita area is A and the number of people is n, then a corresponding reference area is n*A, plus the areas of some fixed users or fixed equipment in the venue (e.g., bands/hosts/lead dancers/screen). The reference area is multiplied by a coefficient k to represent the areas of the fixed users or fixed equipment. Then, the total area S=n*A*k. The congestion coefficient c may be set to correspond to crowded, medium, comfortable, etc. to adapt to different needs. Then, the total area S=n*A*k*c. The congestion coefficient c may be set to c=0.8 for crowded, c=1 for medium, and c=1.2 for comfortable. Through the formula, the area size of the second area can be accurately determined based on the listener quantity information, the per capita area information, and the congestion coefficient.

In some other embodiments, the second area size may be determined without using a formula. For example, the second area size may be determined by determining the corresponding interval mapping relationship through empirical values based on the listener quantity information, the per capita area information, and the congestion coefficient.

By determining the area size of the second area, and because the area size of the second area is related to the listener quantity information, the per capita area information, and the congestion coefficient, the second area can be determined to adapt to various situations and meet the needs of different listeners, thereby providing a more appropriate 3D surround sound field.

After the area size of the second area is determined, two side lengths of the second area are constrained by the area size. Therefore, at S351, the preset rules can be combined with the area size of the second area to determine initial side lengths of the second area.

In some embodiments, the preset rules may be a preset size design regarding the rectangle. For example, the preset rules may be to always keep the second area as a square. That is, the initial side lengths of the second area may be obtained by taking the square root of the area. In another example, the preset rules may be that the rectangle of the second area is a golden rectangle, that is, the ratio of a short side to a long side of the rectangle is a golden separation ratio, which is 0.618, to determine the initial side lengths of the second area. In some other embodiments, if the first area is a block area, a side length relationship of the second area may also be determined based on the side length relationship of the circumscribed rectangle of the first area, that is, the side length relationship of the second area and the side length relationship of the circumscribed rectangle of the first area are similar. In addition, the side length relationship of the second area can also be determined with reference to the side length relationship of the circumscribed rectangle of the third region, that is, the circumscribed rectangles of the second area and the third area are made similar.

Figure 6:
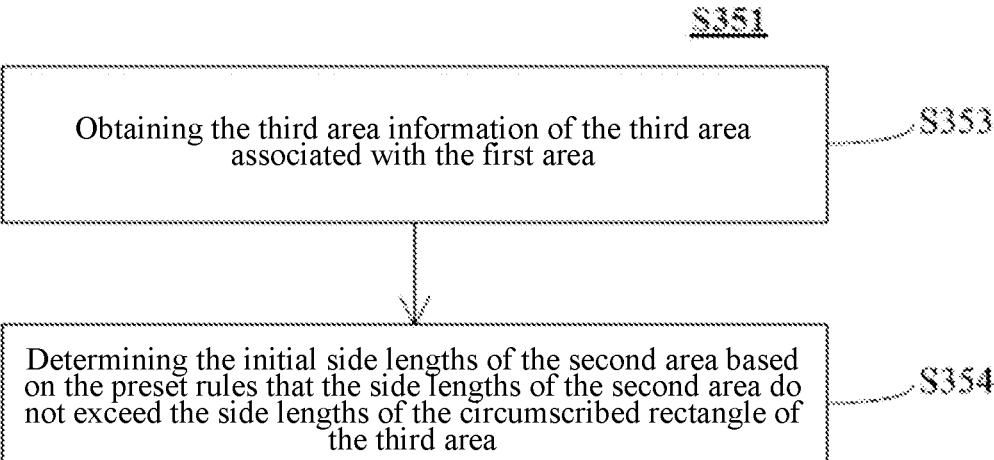
FIG. 6 is a flowchart of an exemplary implementation of S351 in FIG. 5.

In some other embodiments, referring to FIG. 6, S351 further includes the following processes.

At S353, the third area information of the third area associated with the first area is obtained, where the third area information includes the side lengths of the circumscribed rectangle of the third area.

At S354, the initial side lengths of the second area are determined based on the preset rules that the side lengths of the second area do not exceed the side lengths of the circumscribed rectangle of the third area.

In some embodiments, as shown in FIG. 6, when determining the initial side lengths of the second area, the area size of the third area has been used as a reference basis, such that when determining the initial side lengths of the second area, the actual situation is taken into consideration. The resulted initial side length of the second area is more realistic and operable, and occurrence of the second area exceeding the third area can be substantially reduced.

In some embodiments, the initial side lengths of the second area determined based on the preset rules and the area size of the second area may be used as target side lengths of the second area. In some other embodiments, as shown in FIG. 5, after determining the initial side lengths of the second area at S351, S352 needs to be performed: based on the third area information of the third area associated with the first area, or a user instruction, the initial side lengths of the second area are adjusted to the target side lengths.

That is, even if the actual site conditions are not taken into account when determining the initial side lengths of the second area at S351, that is, the third area is not considered, causing the second area to exceed the scope of the third area, S352 can be used to adjust the initial side lengths at S351.

Figure 7A:
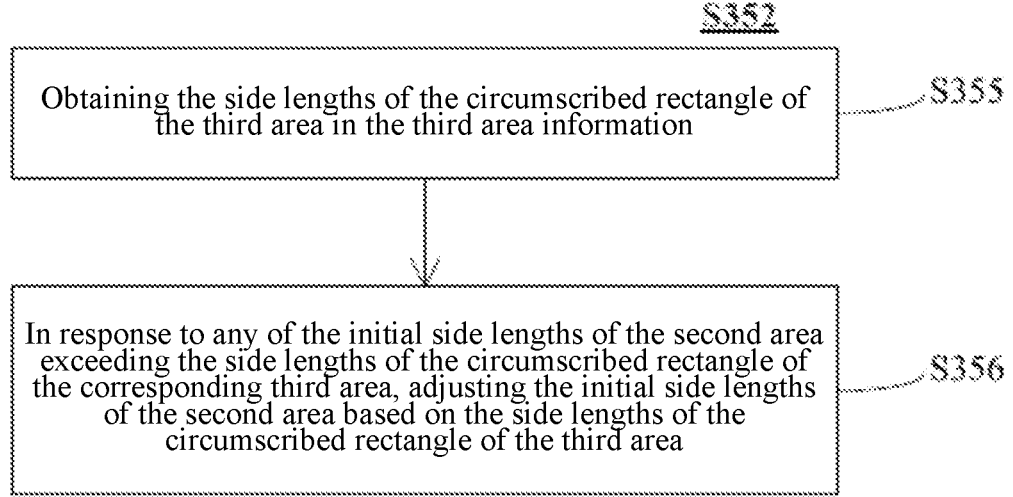
FIG. 7A is a flowchart of an exemplary implementation of S352 in FIG. 5.

S352 can be used to adjust the initial side lengths of the second area based on the third area information. In some embodiments, as shown in FIG. 7A, S352 further includes the following processes.

At S355, the side lengths of the circumscribed rectangle of the third area in the third area information is obtained.

At S356, in response to any of the initial side lengths of the second area exceeding the side lengths of the corresponding circumscribed rectangle of the third area, the initial side lengths of the second area are adjusted based on the side lengths of the circumscribed rectangle of the third area.

That is, a maximum range of the side lengths of the second area is obtained based on the side lengths of the circumscribed rectangle of the third area, such that side length ranges of the second area fall within the side lengths of the circumscribed rectangle of the third area, thereby reducing the situation where the second area exceeds the range of the third area.

Figure 7B:
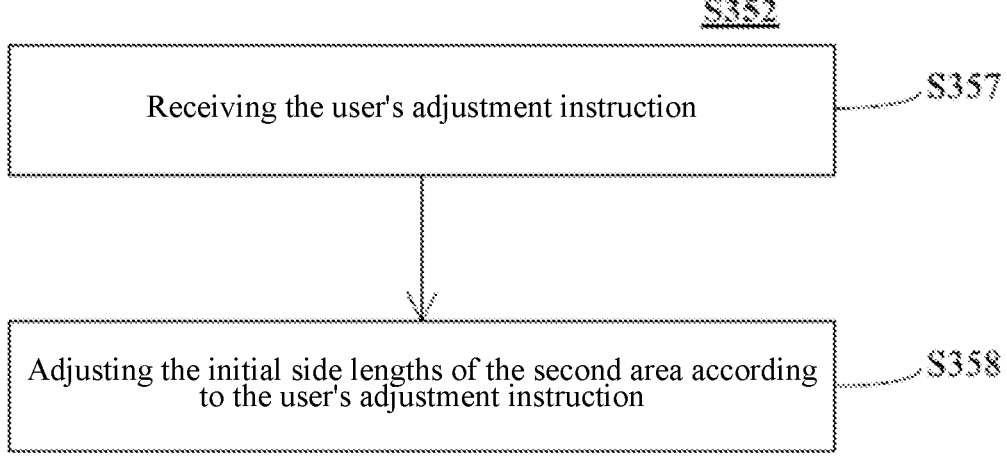
FIG. 7B is a flowchart of another exemplary implementation of S352 in FIG. 5.

S352 may also modify the initial side lengths of the second area based on the user instruction. In this case, as shown in FIG. 7B, S352 further includes the following processes.

At S357, the user's adjustment instruction is received, which indicates at least one side of the second area.

At S358, the initial side lengths of the second area are adjusted according to the user's adjustment instruction.

In the above description, the third area is defined as the open space where the first area is located. In some use scenarios, although the naturally existing third area may be obtained through map data and real-time detection, some artificial regulations cannot be known in time. For example, the third area where the first area is located is very large and can include four venues A, B, C, and D. If the user only rents the venue A, the cars integrated into the combined speaker cannot be parked in the venue B, the venue C, or the venue D. Thus, it is necessary to give the user the opportunity to manually adjust the rectangle of the second area.

For example, the user's adjustment instruction may indicate at least one side of the second area, usually indicating one side of the second region, including a position and a length of the side. By adjusting the position of the side, the distance relative to the side can be adjusted. The length of the other two adjacent sides can be adjusted. By adjusting the length of the side, the positions of the other two adjacent sides can also be adjusted, such that the side length information of the second area can be comprehensively adjusted.

In some other embodiments, the user's adjustment instruction may be implemented by the user dragging a specified side on the interactive interface. For example, if the user drags the left side of the rectangle outward (that is, moves the left side to the left), it means that the length of the upper and lower sides adjacent to the left side will increase simultaneously by a distance dragged by the user. At the same time, because the area size of the second area is determined, the side lengths of the left and right sides need to be automatically adjusted (or reduced in this case) according to the adjusted side lengths of the upper and lower sides. Because the user drags the left side of the rectangle outward in a clear direction, although the lengths of the upper and lower sides change, the position of the right side of the rectangle does not change. The upper and lower sides extend to the left. Because the side lengths of the left and right sides are automatically adjusted, it is assumed that the adjustment of the side lengths will be reflected evenly on upper and lower ends of the left and right sides, that is, the upper and lower ends of the left and right sides will be indented toward the midpoint and the left and right sides become shorter. Although only the situation in which the user drags the left side of the rectangle outward is described, those skilled in the art will know based on the above description how to adjust the side length information of the remaining sides of the second area according to the adjustment instruction of the user dragging the specified side.

As described above, in addition to determining the side lengths of the rectangular second area, it is also necessary to determine the relative position of the second area compared to the first area. As shown in FIG. 5, S360 further includes the following processes.

At S361, in response to the first area information indicating that the first area is a central area, the relative position relationship is determined to be that the first area is located in the middle of the second area.

At S362, in response to the first area information indicating that the first area is a peripheral area, the relative position relationship is determined as the first area passing through a side of the second area.

As described above, the first area information indicated by the user's request may indicate whether the first area is a central area or a peripheral area. At S360, the relative position relationship of the second area with respect to the first area is determined according to whether the first area is a central area or a peripheral area, and the second area can be confirmed, such that the target position of each target car can be determined based on the boundary of the second area.

Further, under the circumstance that the first area information indicates that the first area is a peripheral area, when determining which side of the second area the first area passes through, the user's instruction may be used to determine a specific side of the second area the first area passes through. In some other embodiments, which specific side of the second area the first area passes through can also be determined based on the relative position relationship between the first area and the third area. Alternatively, any side can be selected initially and the user may adjust it according to the actual situation.

After S310, the second area information of the second area is determined. At S320, the target position of each target car needs to be determined based on the second area information and the vehicle quantity information. In some embodiments, S320 further includes the following processes.

At S321, in response to the relative position relationship in the second area information being that the first area is located in the middle of the second area, according to the vehicle quantity information, the target position of the target car can be determined based on the boundary of the second area.

At S322, in response to the relative position relationship in the second area information being that the first area passes through a side of the second area, according to the vehicle quantity information, the target position of each target car can be determined based on positions on the boundary of the second area that are closest to the first area.

Figure 10A:
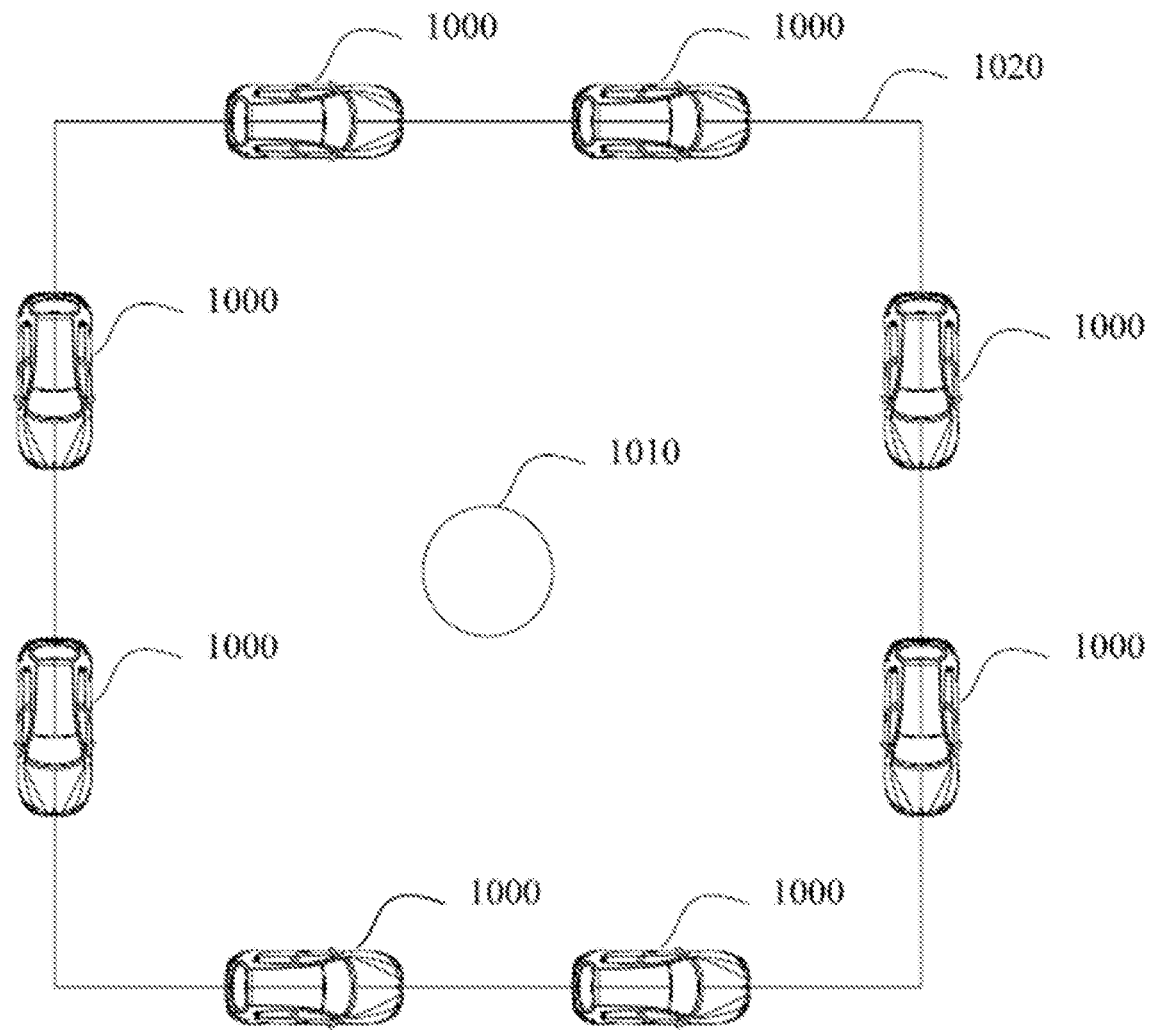
FIGS. 10A-10D are schematic diagrams showing relationships among a first area, a second area, a third area, and a target car according to some embodiments of the present disclosure.
Figure 10B:
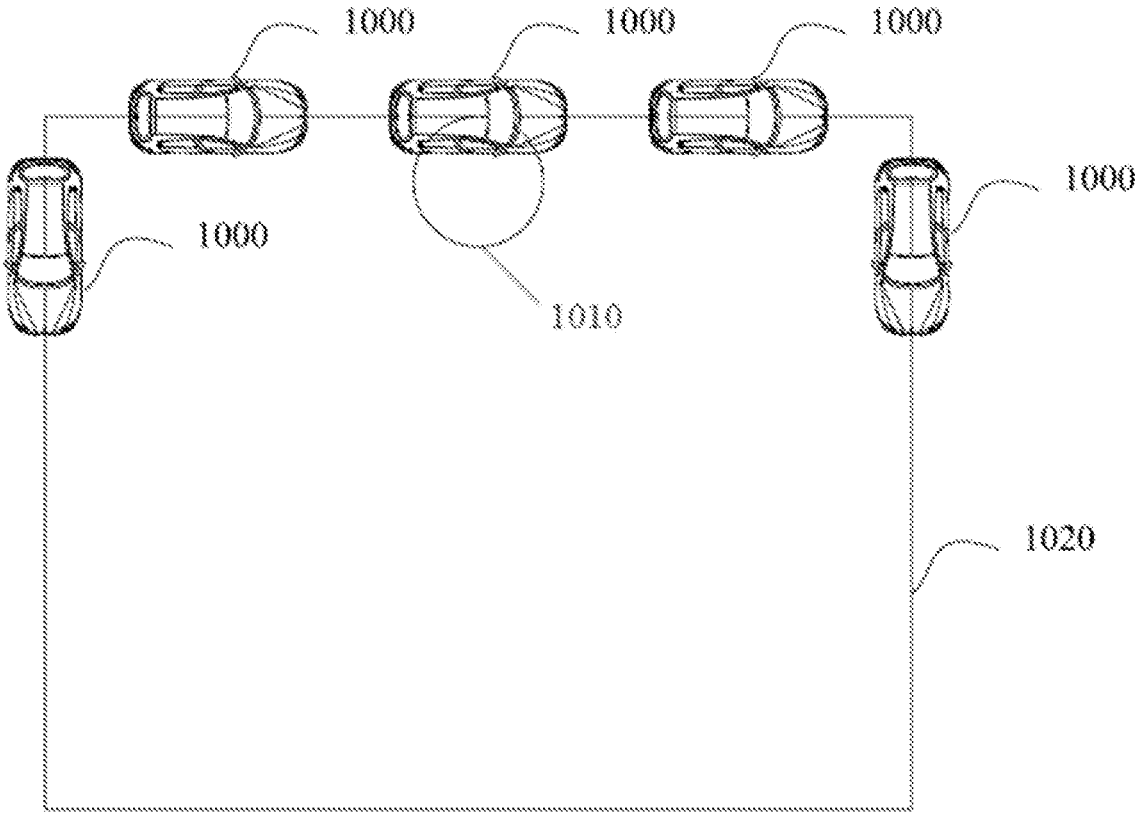

S320 is further described in conjunction with FIG. 10A and FIG. 10B. FIG. 10A illustrates that the first area 1010 is a central area. Thus, as shown in FIG. 10A, the first area 1010 is located in the center of the second area 1020. Because the first area is the central area, it is assumed that the cars constituting the combined speaker are evenly arranged around the central area being the first area. Therefore, the target positions of the cars 1000 are evenly distributed according to the number of the target cars based on the boundaries of the second area.

Those skilled in the art can evenly set the target positions of each target car in different ways based on the number of the target cars. For example, the number of the target cars assigned to each side are determined, and then the number of the target cars are evenly distributed within each side. In another example, a distance between adjacent target cars along all the sides of the rectangle is determined based on the total number of the target cars evenly distributed along the perimeter of the rectangle, and then the target position of each target car is determined. In another example, the center of the rectangle can be used as an origin, and a plurality of rays can be formed to evenly divide the 360-degree angular range according to the number of the target cars, and the intersection of each ray and the rectangle is the target position of each target car.

FIG. 10B illustrates that the first area is a peripheral area. Therefore, as shown in FIG. 10B, the first area 1010 passes through one side of the second area 1020. Because the first area 1010 is a peripheral area, the target position of each target car 1000 needs to be determined based on the number of the target cars and the boundary of the second area 1020 closest to the first area 1010.

It can be understood that the boundary of the second area 1020 that is closest to the first area 1010 is the side of the second area 1020 that the first area 1010 passes through. Therefore, the target cars need to be mainly concentrated on the side of the second area 1020 through which the first area 1010 passes. Under certain circumstance, if there are a large number of target cars and it is not feasible to gather the target cars on the same side, the two sides adjacent to the side of the second area 1020 that the first area 1010 passes through can also be considered as the boundary closest to the first area 1010. Especially the portions of the two adjacent sides adjacent to the side of the second area 1020 through which the first area 1010 passes, as shown in FIG. 10B.

The use scenario where the first area is the peripheral area is more suitable for scenes such as outdoor movies and concerts where users are concentrated on the same side of the stage. The use scenario where the first area is the central area is more suitable for scenes where there is no main stage or where users sit around like a ball game.

Figure 10C:
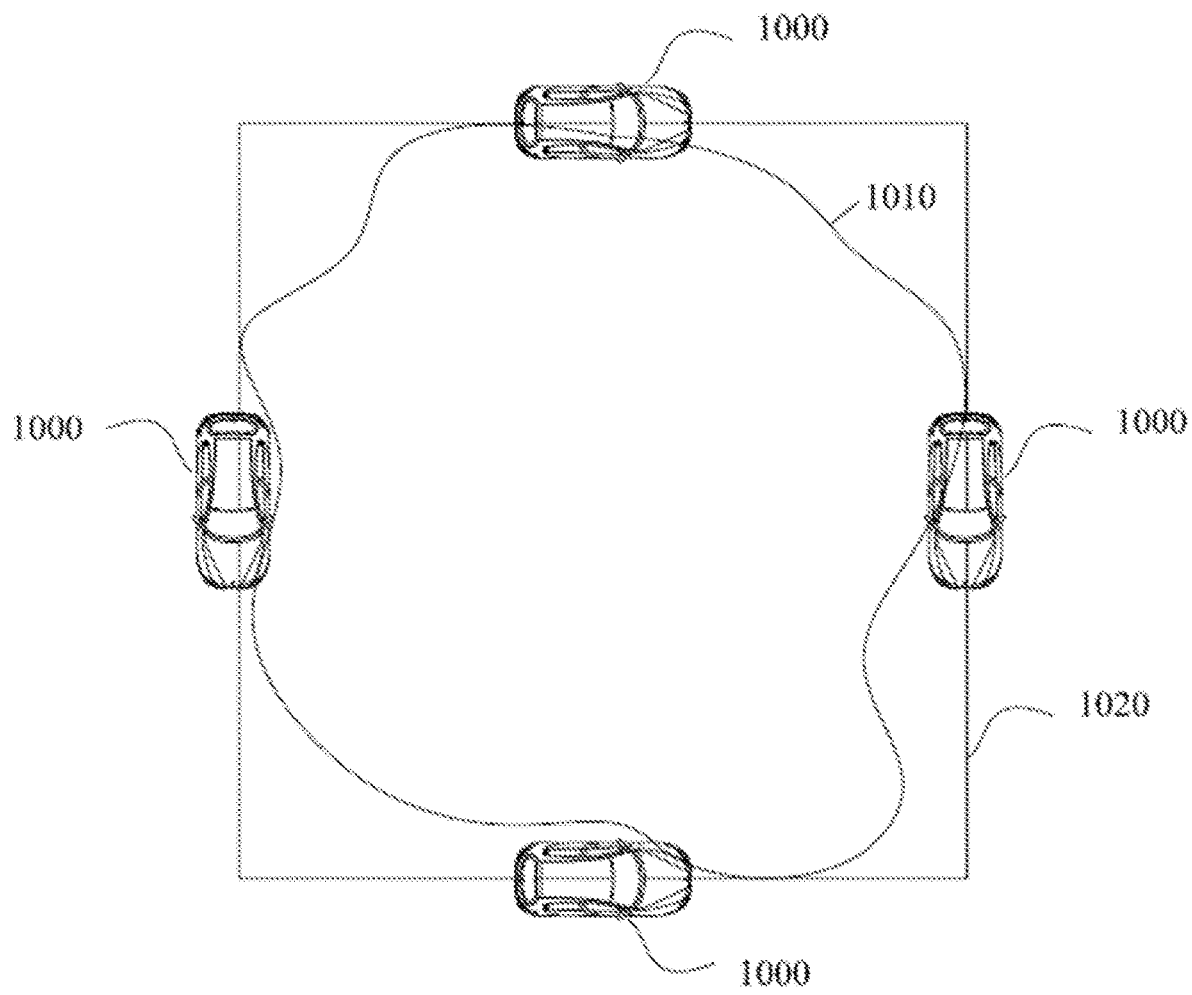

S370 and S380 are further described in conjunction with FIG. 10C and FIG. 4. At S300, if the first area 1010 defined by the user at S100 is a block area that exceeds the preset size, or the user clarifies that the first area 1010 is the area where all the listeners are located, rather than just referring to the area where the user is located, the second area 1020 can be determined directly based on the first area 1010 specified by the user. Thus, the target position of the target car may be determined based on the second area 1020.

As described above, because there is no guarantee that the first area defined by the user is a regular shape, to facilitate subsequent positioning of the target cars, at S370, the second area 1020 is determined to be the circumscribed rectangle of the first area 1010. Therefore, the side lengths of the second area 1020, the relative position relationship with the first area 1010, etc. can be determined.

At S380, because the second area 1020 is determined to be the circumscribed rectangle of the first area 1010 at S370, the second area 1020 surrounds the first area 1010. Therefore, referring to S321, the vehicle quantity information is used to determine the target position of each target car based on the entire boundary of the second area 1020. That is, the target cars 1000 are evenly distributed on the entire boundary of the second area 1020.

Figure 10D:
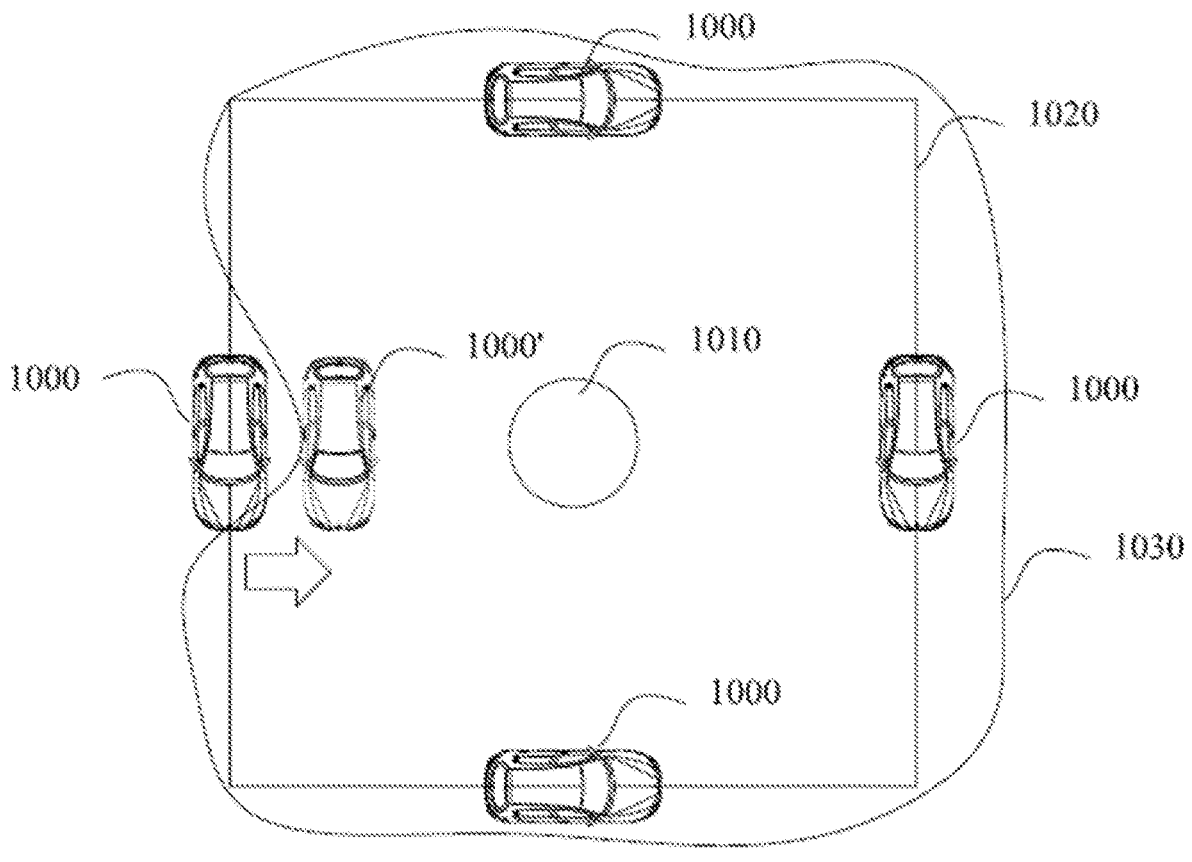

S391 and S392 are further described in conjunction with FIG. 10D and FIG. 4. In some embodiments, S391 and S392 can be used as catch-all processes to finally adjust each target car to the most appropriate target position. As shown in FIG. 10D, because the third area 1030 is an actual site situation, even if it is theoretically true that the target position of each target car determined at S320 or S380 is within the third area 1030, deviations may occur because of car parking angle and car size, etc.

Therefore, the third area information needs to be obtained at S391, and the third area information indicates area boundary information of the boundary of the third area 1030. At S392, based on the area boundary information, in response to the occurrence of the target position of the target car exceeding the boundary of the third area 1030, the adjusted target position of each target car is determined on the boundary of the third area 1030 closest to each target car. Referring to FIG. 10D, if there is a target car that exceeds the left boundary of the third area 1030, then the position closest to the current target car 1000 position is determined on the left boundary of the third area 1030, and the position is determined as the adjusted target position of the out-of-boundary car. Although it is not precise enough, for the convenience of illustration, the position of the target car 1000' is used to represent the closest position in FIG. 10D. The illustration in FIG. 10D should not be unduly over-interpreted.

So far, the specific implementation of S300 has been described. After completing S300, as shown in FIG. 3, S400 is executed to output the target position such that each target car moves to the corresponding target position.

In some embodiments, at S400, the target position is output to a power system of the car through the control device 210, such that the car can be controlled through the control device 210 to automatically move to the target position. The power system refers to the power system of existing or future cars, and refers to the entire mechanical arrangement process in which the power generated by the engine/motor is transmitted through a series of power transmission and finally to the wheels.

In some embodiments, at S400, the target position is output to the interactive interface through the control device 210, and the user can determine the target position of each target car based on the interactive interface, and thereby manually driving the cars to the target positions thereof.

Because the vehicle-mounted external speakers in the present disclosure are mounted on the car, the position of the vehicle-mounted external speaker can be easily moved by moving the car, which can greatly reduce the labor force of manually transporting speakers. Even compared to some solutions that already provide ordinary speakers with mobility capabilities, such as pre-laying speaker moving tracks, adding moving parts to the speakers, etc. Because the present disclosure converts the movement of the speaker into the movement of the car, no preset track is required, no moving parts need to be added, and no additional costs will be added.

As shown in FIG. 3, in some embodiments, after S400, S600 is directly executed. That is, each target car is controlled to play the audio data through a vehicle-mounted external speaker at its target position.

As shown in FIG. 3, there is another preferred embodiment, that is, after S400, S500 is first executed, and then S600 is executed.

At S500, playback parameters of each target car are determined, where the playback parameters include at least one of a target vehicle-mounted external speaker, a target sound channel, or a target volume of each target car.

Figure 9:
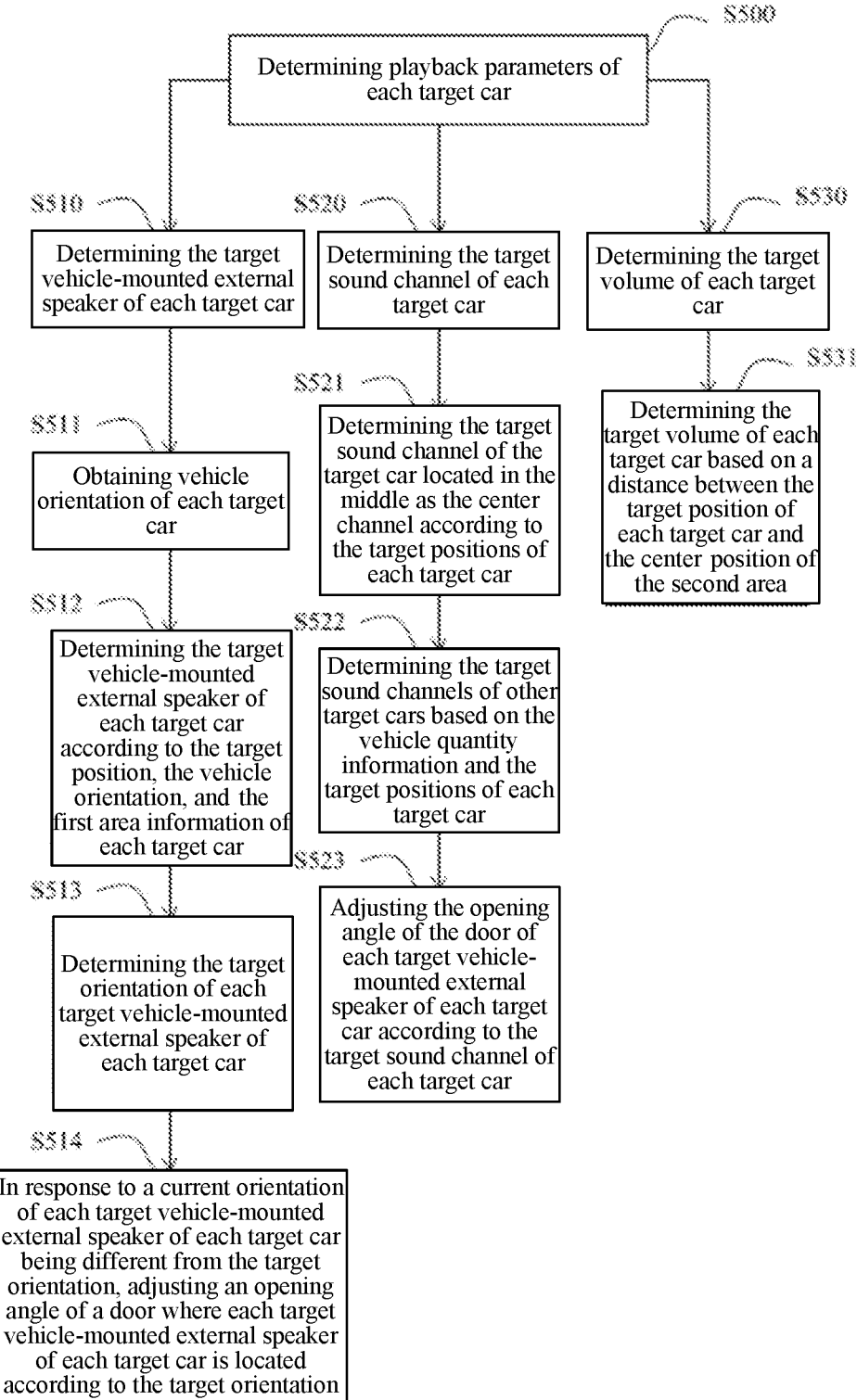
FIG. 9 is a flowchart of an exemplary implementation of S500 in FIG. 3.

S500 is further described in conjunction with FIG. 9. As shown in FIG. 9, S500 can be further divided into the following processes.

At S510: the target vehicle-mounted external speaker of each target car is determined; and/or, At S520, a target sound channel of each target car is determined; and/or, At S530, the target volume of each target car is determined.

S510 further includes the following processes.

At S511, vehicle orientation of each target car is obtained.

At S512, the target vehicle-mounted external speaker of each target car is determined according to the target position, the vehicle orientation, and the first area information of each target car.

It can be known from FIG. 1 that in the present disclosure, each target car is provided with a plurality of vehicle-mounted external speakers surrounding the vehicle body. Based on FIGS. 10A-10D, it can be known that when the cars surround the first area, the vehicle-mounted external speaker facing toward the first area actually plays a main sound transmission role. For the sake of energy saving, the vehicle-mounted external speaker facing toward the first area may be enabled to operate, and the vehicle-mounted external speakers facing away from the first area may be turned off. Therefore, the vehicle orientation of the target car can be determined at S511, thereby determining the target vehicle-mounted external speaker that needs to be operated according to the vehicle orientation.

Furthermore, due to site constraints, the target cars are often parked according to the target positions thereof. However, because each on-board external speaker on the car is distributed in different places on the vehicle body. Generally, the target on-board external speaker may not be accurately aimed at the center of the second area (that is, the center of the listener area). Therefore, in some embodiments, after S512, the present disclosure also includes the following processes.

At S513, the target orientation of each target vehicle-mounted external speaker of each target car is determined. The target orientation points to the center position of the second area.

At S514, in response to a current orientation of each target vehicle-mounted external speaker of each target car being different from the target orientation, an opening angle of a door where each target vehicle-mounted external speaker of each target car is located is adjusted according to the target orientation. That is, the present disclosure can not only turn off the vehicle-mounted external speakers facing away from the first area for the sake of energy saving, but also adjust the car's external speaker toward the center of the second area to produce sound for better sound effects by adjusting the opening angle of the door where the vehicle-mounted external speaker is located under the circumstance that the target position of the target car has been determined.

In another aspect of S500, S520 further includes the following processes.

At S521, according to the target positions of each target car, the target sound channel of the target car located in the middle is determined as the center channel.

At S522, the target sound channels of other target cars are determined based on the vehicle quantity information and the target positions of each target car.

In some embodiments, at S521, the first area is the central area and the target cars are evenly arranged around the second area. The target car located in the middle refers to the target car to which the user faces. In some embodiments, the first area is a peripheral area and the target car passes through the side of the second area that is closest to the first area. The target car located in the middle among the plurality of target cars may be determined based on the relative arrangement between the plurality of target cars.

At S522, after the target car of the center channel is determined, different channels may be set according to the vehicle quantity information and the relative position relationship between the target car and the first area. For example, a left channel, a left center channel, a center channel, a right center channel, and a right channel may be designed to correspond to a playback channel of distant sounds, and a bass channel, etc., to create a surround sound field and bring users immersive listening effects.

In some embodiments, the bass channel is designed when designing the channel. In terms of implementation, for some vehicles with scissor doors, when a scissor door is opened, the vehicle-mounted external speaker disposed on the scissor door has a high position, covers a higher and farther space, and complements the vehicle-mounted external speakers at lower positions. The scissor door may be selected to be opened to complete a normal channel, and cars without opening the scissor door may be selected to complete the bass channel. In some embodiments, S520 further includes the following processes.

At S530, according to the target sound channel of each target car, the opening angle of the door of each target vehicle-mounted external speaker of each target car is adjusted, thereby adjusting the coverage of each vehicle-mounted external speaker to control the best presentation of each channel.

In another aspect of S500, S530 further includes the following processes.

At S531, the target volume of each target car is determined based on the distance between the target position of each target car and the center position of the second area.

The playback volume of each target vehicle-mounted external speaker is also one aspect that affects the user's auditory sense. Therefore, at S531, it is necessary to determine the target volume for each target speaker based on the distance between the target position of the target car and the center position of the second area (listener gathering area).

Based on human physiological parameters, a desired relative sound loudness range acceptable to the human ear may be preset (for example, 40-60 decibel range). The target volume refers to the relative position relationship between the user and the car, such that when the sound emitted by the vehicle mounted external speakers reaches the user, it can maintain the volume within a preset optimal relative sound loudness range (40-60 decibels). It should be noted that the above information about 40-60 decibels is merely exemplary and should not unduly limit the present disclosure.

For example, the volume of each vehicle-mounted external speaker will increase as the distance increases. In some embodiments, the noise in the user's surrounding environment may also be considered to dynamically adjust the volume.

For example, assuming that a reference distance between the car and the center of the second area is A, and the corresponding volume is X. For each incremental distance $\Delta A$, the volume will be increased by $\Delta X$. A surrounding environmental noise is n, and a noise volume compensation coefficient is k. Then, the volume when the distance is A' is $X'=X+\Delta X*(A'-A)/\Delta A+(n-50)*k$.

For example, assuming that A=5 meters, X=20, $\Delta A$=5 meters, $\Delta X$=4, n=80, k=0.2, and it can be calculated that: i. when A'=10 meters, X'=30; ii. when A'=15 meters, X'=34; iii. when A'=20 meters, X'=38.

After the playback parameters of each target car are determined at S500, at the corresponding S600, each target car located at the respective position is controlled to play the audio data through the vehicle-mounted external speaker based on the playback parameters of each target car. Different positions, different channels, and different volumes of the target cars may be combined to provide the users with a desired sound field to listen to the audio data.

So far, the specific implementation of the car audio playback method provided by the present disclosure has been described. The present disclosure provides a method of integrating multiple cars into a large-scale mobile combination speaker capable of providing a 3D surround sound field, which can accompany users when traveling and facilitate their use in open spaces, thereby expanding the application scenarios of the cars and improving user experience. The present disclosure can determine the position of each target car according to the first area for listening to the audio data and the number of target cars indicated by the user to provide a suitable 3D surround sound field, thereby improving the overall auditory effect and providing a desired user experience. The present disclosure can determine the second area of the rectangle based on the first area indicated by the user, and determine the target position of each target car based on the second area of the rectangle. Thus, the uncertainty and difficulty of determination caused by irregularities of the shape of the open field can be reduced when determining the target position of the target car, which is more universal and suitable for a wide range of applications. The present disclosure can comprehensively determine the area size of the rectangular second area used to determine the target position of each target car by taking into account the listener quantity information, the per capita area information, and the congestion coefficient information, such that the side lengths of the rectangular second area can be determined based on the area size of the rectangular second area, which makes it possible to determine a more appropriate target position for each target car to provide a desired 3D surround sound field. The present disclosure can comprehensively consider the third area information indicating the open space to determine the side lengths of the rectangular second area, which provides the possibility to determine the more appropriate target position for each target car to provide the desired 3D surround sound field. The present disclosure can determine the relative position relationship between the rectangular second area and the first area according to the user's instruction about the first area, such that the target position of each target car can be determined based on the rectangular second area to ensure the relative positions between the target cars and the listening users to provide a high-quality 3D surround sound field. The present disclosure can directly determine the second area of the rectangle according to the user's instruction about the first area, thereby directly determining the target position of the target car in response to the user's instruction about the first area. The present disclosure can comprehensively consider the third area information indicating the open space to determine whether the target position of each target car exceeds a reasonable limit, that is, whether it exceeds the boundary of the third area, thereby adjusting the target position of each target car based on the boundary of the third area, and satisfying actual site requirements. The present disclosure can comprehensively determine the playback parameters of each target car by combining the target position and target orientation of the target car. The playback parameters include at least one of the target vehicle-mounted external speakers, the target sound channel, or the target volume of each target car. Thus, through adjusting the target position of each target car, the target sound channel and the target volume of each target car, and the target vehicle-mounted external speakers, the desired 3D surround sound field can be provided to the users.

The present disclosure also provides a control device. The control device includes: at least one processor; and a memory coupled to the at least one processor. The memory includes instructions stored therein. When being executed by the at least one processor, the instructions cause the control device to execute the car audio playback method as shown in FIG. 3.

Figure 11:
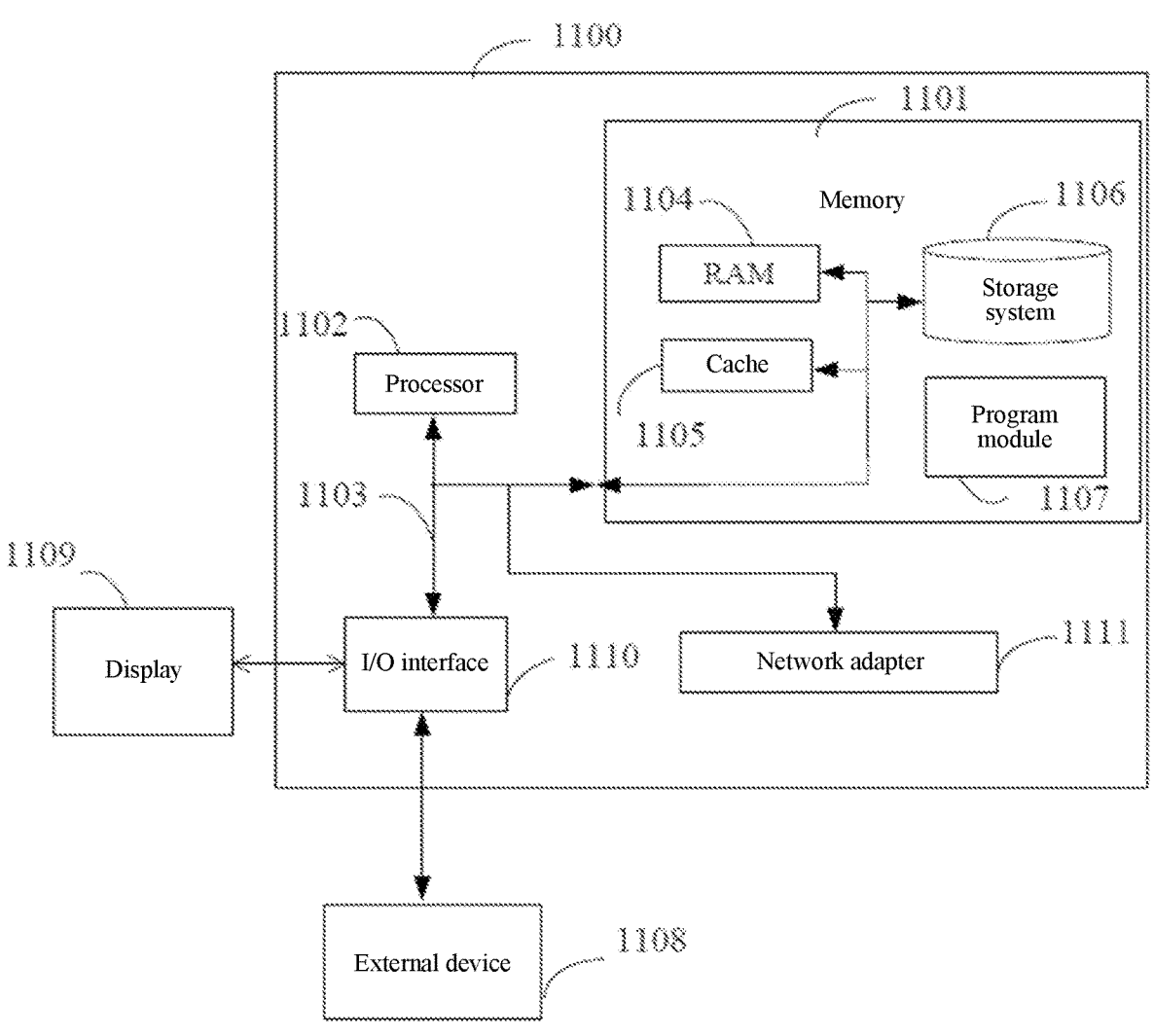
FIG. 11 is a schematic structural diagram of a control device of an exemplary car audio playback system according to some embodiments of the present disclosure.

Referring to FIG. 11, the control device 1100 for a vehicle-mounted external speaker is provided by the present disclosure. In some embodiments, as shown in FIG. 11, the control device 1100 is in the form of a general computer device and is used to implement the steps of the car audio playback method described in any of the above embodiments. For details, reference can be made to the above description of the car audio playback method, and details will be omitted herein.

The components of the control device 1100 may include one or more memories 1101, one or more processors 1102, and a bus 1103 connecting different system components (including the memory 1101 and the processor 1102).

The bus 1103 includes a data bus, an address bus, and a control bus. A product of a number of bits on the data bus and an operating frequency is proportional to a data transfer rate. A number of bits on the address bus determines a maximum addressable memory space. The control bus (read/write) indicates a type of bus cycle and a moment of completion for this input/output operation. The processor 1102 is connected to the memory 1101 through the bus 1103, and is configured to implement the car audio playback method provided by any of the above embodiments.

As the computing and control core of the control device 1100, the processor 1102 is the final execution unit for information processing and program execution. The operations of all software layers in the computer system will eventually be mapped to the operations of the processor 1102 through the instruction set. The functions of the processor 1102 are mainly to process instructions, perform operations, control time, and process data.

The memory 1101 refers to various storage devices in a computer that store programs and data. The memory 1101 may include computer system readable media that include a volatile memory, for example, a random-access memory (RAM) 1104 and/or a cache memory 1105.

The RAM 1104 is an internal memory that exchanges data directly with the processor 1102. It can be read and written at any time (except when refreshing), and it is very fast. It is usually used as a temporary data storage medium for the operating system or other running programs. Once the power is cut off, the data stored in it will be lost. The cache memory 1105 is a primary memory that exists between the main memory and the processor 1102. Its capacity is relatively small but its speed is much higher than the main memory and is close to the speed of the processor 1102.

It should be noted that when the control device 1100 includes multiple memories 1101 and multiple processors 1102, there may be a distributed structure between the multiple memories 1101 and between the multiple processors 1102. For example, it may include the memory and the processor located on the local side and the background cloud respectively to jointly implement the car audio playback method by the local side and the background cloud. Furthermore, in the embodiments using a distributed structure, the specific execution terminal of each step can be adjusted according to the actual situation, and the specific solution of implementing each step on a specific terminal should not unduly limit the scope of protection of the present disclosure.

The control device 1100 may further include other removable/non-removable, volatile/non-volatile computer system storage media. In some embodiments, the storage system 1106 may be used to read and write non-removable, non-volatile magnetic media.

The memory 1101 may also include at least one set of program modules 1107. The program modules 1107 may be stored in the memory 1101. The program modules 1107 include, but are not limited to, an operating system, one or more applications, other program modules, and program data, each of which, or some combination, may include implementation of a network environment. The program modules 1107 generally perform functions and/or methods in the described embodiments of the present disclosure.

The control device 1100 may also communicate with one or more external devices 1108. In some embodiments, the external devices 1108 include the vehicle-mounted external speakers, the camera devices, the power devices, etc. as described above. The external devices 1108 also include a display 1109. When implementing the car audio playback method, the control device 1100 can feedback operation conditions of each target speaker through the display 1109, and provide an interactive interface to interact with the user.

The control device 1100 may also communicate with one or more devices that enable a user to interact with the control device 1100, and/or with any device that enables the control device 1100 to communicate with one or more other computing devices (e.g., a network card, modem, etc.) The communication may occur through the input/output (I/O) interface 1110.

The control device 1100 may also communicate with one or more networks (e.g., a local area network (LAN), a wide area network (WAN), and/or a public network, such as the Internet) through a network adapter 1111. As shown in FIG. 11, the network adapter 1111 communicates with other modules of the control device 1100 through the bus 1103. It should be understood that, although not shown in the drawings, other hardware and/or software modules may be used in conjunction with the control device 1100, including but not limited to: microcode, device drivers, redundant processing units, external disk drive arrays, RAID systems, tape drives, and data backup storage system, etc.

The present disclosure also provides a computer-readable storage medium that stores a computer program. When the computer program is executed by a processor, the steps of the car audio playback method described in any of the above embodiments are implemented. For details, reference can be made to the above description, which will not be repeated herein. In addition, it can be understood that the computer-readable storage medium can also be in the form of a system, that is, it includes multiple computer-readable storage sub-media, such that the steps of the car audio playback method can be jointly implemented through multiple computer-readable storage media.

The various illustrative logic modules, and circuits described in connection with the embodiments disclosed herein may be implemented with a general purpose processor, a digital signal processor (DSP), an application specific integrated circuit (ASIC), a field programmable gate array (FPGA) or other programmable logic devices, discrete gates or transistor logics, discrete hardware components, or any combination thereof designed to perform the functions described herein. A general-purpose processor may be a microprocessor. Alternatively, the processor may be any conventional processors, controllers, microcontrollers, or state machines. The processor may also be implemented as a combination of computing devices, such as a combination of a DSP and a microprocessor, a plurality of microprocessors, one or more microprocessors coupled with a DSP core, or any other such configurations.

The steps of a method or algorithm described in connection with the embodiments disclosed herein may be embodied directly in hardware, in a software module executed by a processor, or in a combination of both. Software modules may reside in a RAM memory, a Flash memory, a ROM memory, an EPROM memory, an EEPROM memory, registers, a hard disk, a removable disk, a CD-ROM, or any other form of storage medium known in the art. An example storage medium is coupled to the processor such that the processor can read and write information from/to the storage medium. Alternatively, the storage medium may be integrated into the processor. The processor and storage media can reside in an ASIC. The ASIC can reside in a user terminal. Alternatively, the processor and storage medium may reside as discrete components in the user terminal.

In some embodiments, the functions described may be implemented in hardware, software, firmware, or any combination thereof. If implemented in software as a computer program product, the functions may be stored on or transmitted over as one or more instructions or code on a computer-readable medium. The computer-readable media includes both computer storage media and communication media including any medium that facilitates transfer of a computer program from one place to another. The storage media can be any available media that can be accessed by a computer. By way of example and not limitation, such computer-readable media may include RAM, ROM, EEPROM, CD-ROM or other optical disk storage, magnetic disk storage or other magnetic storage devices, or may be used to carry or store instructions or data structures in the form of any other medium that contains program code and can be accessed by a computer. Any connection is also properly termed a computer-readable medium. For example, if the software is transmitted from a web site, a server, or other remote source using coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used in this specification, the disk and the disc include a compact disc (CD), a laser disc, an optical disc, a digital versatile disc (DVD), a floppy disk, and a Blu-ray disc, among which data is often reproduced in a magnetic way, while discs use lasers to optically reproduce data. Combinations of the above should also be included within the scope of the computer-readable media.

The previous description is provided to enable any person skilled in the art to practice the various aspects described herein. However, it should be understood that the protection scope of the present disclosure should be subject to the appended claims, and should not be limited to the specific structures and components of the embodiments explained above. Those skilled in the art can make various changes and modifications to each embodiment within the spirit and scope of the present disclosure, and these changes and modifications also fall within the protection scope of the present disclosure.

What is claimed is:

1. A car audio playback method comprising:

obtaining a request to play audio data, the request at least indicating first area information of a first area for listening to the audio data, wherein the request further indicates listener quantity information;

determining vehicle quantity information of target cars, each target car including at least one vehicle-mounted external speaker to play the audio data toward the outside of the target car; based on the first area information and the vehicle quantity information, determining a target position of each target car, wherein determining the target position of each target car based on the first area information and the vehicle quantity information further includes:

determining second area information of a second area for listening to the audio data based on the first area information and listener quantity information, the second area being regular-shaped and including the first area; and determining the target position of each target car based on the second area information and the vehicle quantity information;

outputting the target position such that each target car moves to the target position; and controlling each target car to play the audio data via the plurality of vehicle-mounted external speakers at its target position.

2. The car audio playback method according to claim 1, wherein:

the second area information includes a second area size of the second area, side lengths of the second area, and relative position relationship of the second area relative to the first area; and determining the second area information of the second area for listening to the audio data based on the first area information and the listener quantity information further includes:

determining a second area size of the second area based on the listener quantity information, per capita area information, and congestion coefficient information; and determining the side lengths of the second area and a relative position relationship of the second area relative to the first area based on at least the first area information and the second area size.

3. The car audio playback method according to claim 2, wherein determining the side lengths of the second area based on at least the first area information and the second area size further includes:

determining initial side lengths of the second area based on preset rules and the second area size and determining the initial side lengths to be target side lengths.

4. The car audio playback method according to claim 3, wherein determining the initial side lengths of the second area based on the preset rules and the second area size further includes:

obtaining third area information of a third area associated with the first area, the third area information including side lengths of a circumscribed rectangle of the third area; and determining the initial side lengths of the second area based on the preset rules that the side lengths of the second area do not exceed the side lengths of the circumscribed rectangle of the third area.

5. The car audio playback method according to claim 2, wherein determining the side lengths of the second area based on at least the first area information and the second area size further includes:

determining the initial side lengths of the second area based on the preset rules and the second area size; and adjusting the initial side lengths of the second area to the target side lengths based on the third area information of the third area associated with the first area, or a user instruction.

6. The car audio playback method according to claim 5, wherein adjusting the initial side lengths of the second area based on the third area information of the third area associated with the first area further includes:

obtaining the side lengths of the circumscribed rectangle of the third area in the third area information; and in response to any of the initial side lengths of the second area exceeding the side lengths of the circumscribed rectangle of the corresponding third area, adjusting the initial side lengths of the second area based on the side lengths of the circumscribed rectangle of the third area.

7. The car audio playback method according to claim 2, wherein determining the relative position relationship based on at least the first area information and the second area size further includes:

in response to the first area information indicating that the first area is a central area, determining the relative position relationship to be that the first area is located in the middle of the second area; or in response to the first area information indicating that the first area is a peripheral area, determining the relative position relationship as the first area passing through a side of the second area.

8. The car audio playback method according to claim 1, wherein determining the target position of each target car based on the first area information and the vehicle quantity information further includes:

in response to the first area information indicating that the first area is a block area, determining the second area information of the second area for listening to the audio data, the second area being a circumscribed rectangle area of the block area; and determining the target position of each target car based on the boundary of the second area according to the vehicle quantity information.

9. The car audio playback method according to claim 1, before outputting the target position such that each target car moves to the corresponding target position, the method further comprising:

obtaining the third area information of the third area associated with the first area, the third area information including area boundary information indicating an area boundary of the third area; and in response to occurrence of the target position of the target car exceeding the area boundary of the third area, determining an adjusted target position of the target car on the area boundary of the third area closest to the target car based on the area boundary information.

10. The car audio playback method according to claim 1, wherein the vehicle quantity information of the target cars is determined by:

obtaining the third area information of the third area associated with the first area; and determining the vehicle quantity information of the target cars based on the third area information and/or listener quantity information indicated in the request.

11. The car audio playback method according to claim 1, before controlling each target car to play the audio data via the at least one vehicle-mounted external speaker at its target position, the method further comprising:

determining playback parameters of each target car, the playback parameters including at least one of a target vehicle-mounted external speaker, a target sound channel, or a target volume of each target car;

wherein controlling each target car to play the audio data via the at least one vehicle-mounted external speaker at its target position further includes:

controlling the plurality of vehicle-mounted external speakers to play the audio data based on the playback parameters of each target car.

12. The car audio playback method according to claim 11, wherein the playback parameters include a target vehicle-mounted external speaker of each target car, and determining the playback parameters of each target car further includes:

obtaining vehicle orientation of each target car; and determining the target vehicle-mounted external speaker of each target car according to the target position, the vehicle orientation, and the first area information of each target car.

13. The car audio playback method according to claim 12, wherein after the target vehicle-mounted external speaker of each target car is determined, determining the playback parameters of each target car further includes:

determining target orientation of each target vehicle-mounted external speaker of each target car, the target orientation pointing to a center position of the second area; and in response to a current orientation of each target vehicle-mounted external speaker of each target car being different from the target orientation, adjusting an opening angle of a door where each target vehicle-mounted external speaker of each target car is located according to the target orientation;

wherein the second area is a rectangular area that is determined based on at least the first area information and the listener quantity information and includes the first area.

14. The car audio playback method according to claim 11, wherein the playback parameters include a target sound channel of each target car, and determining the playback parameters of each target car further includes:

determining the target sound channel of the target car located in the middle as a center channel based on the target position of the target car; and determining the target sound channels of other target cars based on the vehicle quantity information and the target positions of each target car.

15. The car audio playback method according to claim 14, wherein after determining the target sound channel of each target car, determining the playback parameters of each target car further includes:

according to the target sound channel of each target car, adjusting an opening angle of a door where the target vehicle-mounted external speaker of each target car is installed.

16. A car audio playback system, comprising:

a control device;

a plurality of vehicle-mounted external speakers disposed on a plurality of target cars and configured to play audio data externally; and a communication module, the control device communicating with the plurality of vehicle-mounted external speakers through the communication module;

wherein the control device is configured to:

obtain a request to play the audio data through the communication module, the request at least indicating first area information of a first area for listening to the audio data, wherein the request further indicates listener quantity information;

determine vehicle quantity information of target cars, each target car including at least one vehicle-mounted external speaker to play the audio data toward the outside of the target car;

based on the first area information and the vehicle quantity information, determine a target position of each target car, wherein the control device is configured to determine the target position of each target car based on the first area information and the vehicle quantity information further includes that the control device is configured to:

determine second area information of a second area for listening to the audio data based on the first area information and listener quantity information, the second area being regular-shaped and including the first area; and determine the target position of each target car based on the second area information and the vehicle quantity information;

output the target position such that each target car moves to the target position; and control each target car to play the audio data via the at least one vehicle-mounted external speaker at its target position.

17. The car audio playback system according to claim 16, wherein before outputting the target position such that each target car moves to the corresponding target position, the control device is further configured to:

obtain third area information of a third area associated with the first area, the third area information including area boundary information indicating an area boundary of the third area; and in response to occurrence of the target position of the target car exceeding the area boundary of the third area, determine an adjusted target position of the target car on the area boundary of the third area closest to the target car based on the area boundary information.

18. The car audio playback system according to claim 16, wherein before controlling each target car to play the audio data via the plurality of vehicle-mounted external speakers at its target position, the control device is further configured to:

determine playback parameters of each target car, the playback parameters including at least one of a target vehicle-mounted external speaker, a target sound channel, or a target volume of each target car;

wherein when controlling each target car to play the audio data via the at least one vehicle-mounted external speaker at its target position, the control device is further configured to:

control the plurality of vehicle-mounted external speakers to play the audio data based on the playback parameters of each target car.

* * * * *